US011880162B2

(12) United States Patent
Kigoshi et al.

(10) Patent No.: US 11,880,162 B2
(45) Date of Patent: Jan. 23, 2024

(54) ELECTROPHOTOGRAPHIC PHOTORECEPTOR, PROCESS CARTRIDGE, AND IMAGE FORMING APPARATUS

(71) Applicant: FUJIFILM Business Innovation Corp., Tokyo (JP)

(72) Inventors: Yoichi Kigoshi, Kanagawa (JP); Michinori Fukuma, Kanagawa (JP); Ryota Kaneko, Kanagawa (JP); Jiro Korenaga, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/947,728

(22) Filed: Sep. 19, 2022

(65) Prior Publication Data

US 2023/0114544 A1 Apr. 13, 2023

(30) Foreign Application Priority Data

Sep. 28, 2021 (JP) ................................ 2021-157558
Jul. 5, 2022 (JP) ................................ 2022-108606

(51) Int. Cl.
*G03G 5/00* (2006.01)
*G03G 15/00* (2006.01)
*G03G 5/047* (2006.01)
*G03G 5/07* (2006.01)
*G03G 5/043* (2006.01)

(52) U.S. Cl.
CPC ........... *G03G 5/047* (2013.01); *G03G 5/0436* (2013.01); *G03G 5/0764* (2020.05); *G03G 15/75* (2013.01)

(58) Field of Classification Search
CPC .. G03G 5/0436; G03G 5/047; G03G 5/06142; G03G 5/061443; G03G 5/06147; G03G 5/061473; G03G 5/0764; G03G 15/75; G03G 15/751; G03G 15/752
See application file for complete search history.

(56) References Cited

U.S. PATENT DOCUMENTS

| | | | |
|---|---|---|---|
| 9,341,963 B2 | 5/2016 | Hirakata et al. | |
| 2018/0095372 A1* | 4/2018 | Kigoshi | |
| 2019/0094724 A1* | 3/2019 | Kunisawa | |
| 2019/0346781 A1* | 11/2019 | Katsuhara | G03G 5/047 |
| 2020/0012205 A1 | 1/2020 | Kigoshi et al. | |
| 2020/0363740 A1* | 11/2020 | Matsusaki | G03G 5/14708 |
| 2023/0075407 A1* | 3/2023 | Makisumi | G03G 15/75 |

FOREIGN PATENT DOCUMENTS

| | | |
|---|---|---|
| JP | 5994708 B2 | 9/2016 |
| JP | 2020-8688 A | 1/2020 |

* cited by examiner

*Primary Examiner* — Sophia S Chen
(74) *Attorney, Agent, or Firm* — Sughrue Mion, PLLC

(57) ABSTRACT

An electrophotographic photoreceptor includes a conductive substrate, an undercoat layer on the conductive substrate, a charge generation layer on the undercoat layer, a charge transport layer on the charge generation layer, and an inorganic protection layer on the charge transport layer, in which the charge transport layer contains a binder resin and a charge transport material, and, when impedance of the charge transport layer is measured, a ratio ($C_{1Hz}/C_{10Hz}$) of an electrostatic capacitance $C_{1Hz}$ at 1 Hz to an electrostatic capacitance $C_{10Hz}$ at 10 Hz is 1.1 or less.

20 Claims, 5 Drawing Sheets

ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under USC 119 from Japanese Patent Application No. 2021-157558 filed Sep. 28, 2021, and Japanese Patent Application No. 2022-108606 filed Jul. 5, 2022.

BACKGROUND

(i) Technical Field

The present disclosure relates to an electrophotographic photoreceptor, a process cartridge, and an image forming apparatus.

(ii) Related Art

Japanese Unexamined Patent Application Publication No. 2020-008688 discloses an electrophotographic photoreceptor that includes a conductive substrate, an undercoat layer on the conductive substrate, a charge generation layer on the undercoat layer, a charge transport layer on the charge generation layer, and an inorganic protection layer on the charge transport layer, in which the undercoat layer, the charge transport layer, and the inorganic protection layer each have a film elastic modulus of 5 GPa or more.

Japanese Patent No. 5994708 discloses an electrophotographic photoreceptor that includes a conductive substrate, an organic photosensitive layer on the conductive substrate, and an inorganic protection layer on a surface of the organic photosensitive layer, in which a region of the organic photosensitive layer close to the surface that comes into contact with the inorganic protection layer contains at least a charge transport material and silica particles having a volume average particle diameter of 20 nm or more and 200 nm or less.

SUMMARY

An existing electrophotographic photoreceptor that has an inorganic protection layer sometimes experiences cracking that starts from the inorganic protection layer and reaching the charge transport layer when images are continuously formed. If image formation is continued without addressing cracking, the image density may fluctuate.

Aspects of non-limiting embodiments of the present disclosure relate to an electrophotographic photoreceptor that has an inorganic protection layer, with which image density fluctuation in the event of cracking due to continuous image formation is reduced compared to when, in impedance measurement of the charge transport layer, the ratio ($C_{1Hz}/C_{10Hz}$) of the electrostatic capacitance $C_{1Hz}$ at 1 Hz to the electrostatic capacitance $C_{10Hz}$ at 10 Hz is more than 1.1, or compared to when the charge transport layer contains one charge transport material, and the amount of the charge transport material contained relative to the total amount of the charge transport materials and the binder resin in the charge transport layer is less than 10 mass % or more than 50 mass %.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an electrophotographic photoreceptor that includes a conductive substrate, an undercoat layer on the conductive substrate, a charge generation layer on the undercoat layer, a charge transport layer on the charge generation layer, and an inorganic protection layer on the charge transport layer, in which the charge transport layer contains a binder resin and a charge transport material, and, when impedance of the charge transport layer is measured, a ratio ($C_{1Hz}/C_{10Hz}$) of an electrostatic capacitance $C_{1Hz}$ at 1 Hz to an electrostatic capacitance $C_{10Hz}$ at 10 Hz is 1.1 or less.

BRIEF DESCRIPTION OF THE DRAWINGS

Exemplary embodiments of the present disclosure will be described in detail based on the following figures, wherein.

DETAILED DESCRIPTION

Figure 1:
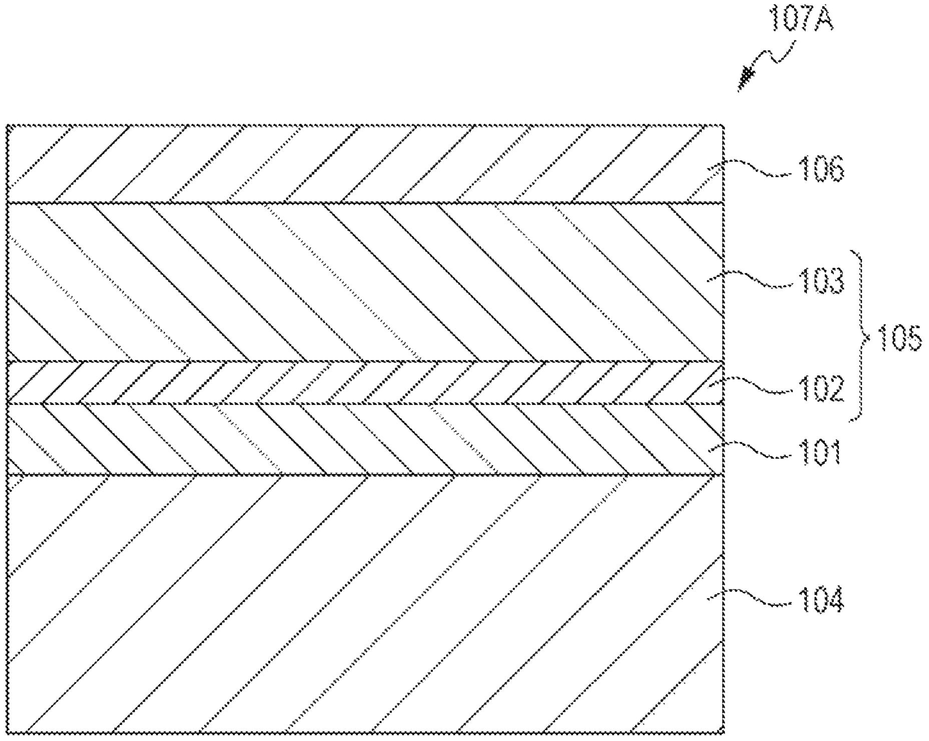
FIG. 1 is a schematic cross-sectional view of one example of the layer structure of an electrophotographic photoreceptor according to one exemplary embodiment.

Exemplary embodiments of the present disclosure will now be described. These descriptions and examples illustrate exemplary embodiments, and do not limit the scope of the exemplary embodiments.

In this description, in numerical ranges described stepwise, the upper limit or the lower limit of one numerical range may be substituted with an upper limit or a lower limit of a different numerical range also described stepwise. In addition, in any numerical range described in the description, the upper limit or the lower limit of the numerical range may be substituted with a value indicated in Examples.

In this description, each of the components may contain more than one corresponding substances.

In this description, when the amount of a component in a composition is described and when there are two or more substances that correspond to that component in the composition, the amount is the total amount of the two or more substances in the composition unless otherwise noted.

Electrophotographic Photoreceptor

An electrophotographic photoreceptor according to a first exemplary embodiment includes a conductive substrate, an undercoat layer on the conductive substrate, a charge generation layer on the undercoat layer, a charge transport layer on the charge generation layer, and an inorganic protection layer on the charge transport layer. The charge transport layer contains a binder resin and a charge transport material, and, when impedance of the charge transport layer is measured, the ratio ($C_{1Hz}/C_{10Hz}$) of the electrostatic capacitance $C_{1Hz}$ at 1 Hz to the electrostatic capacitance $C_{10Hz}$ at 10 Hz is 1.1 or less.

An electrophotographic photoreceptor according to a second exemplary embodiment includes a conductive substrate, an undercoat layer on the conductive substrate, a charge generation layer on the undercoat layer, a charge transport layer on the charge generation layer, and an inorganic protection layer on the charge transport layer. The charge transport layer contains a binder resin and two or more charge transport materials, and the amount of the charge transport materials contained relative to the total amount of the charge transport materials and the binder resin in the charge transport layer is 10 mass % or more and 50 mass % or less.

In this description, the features common to the first and second exemplary embodiments are collectively described as the features of the "present exemplary embodiment".

When images are continuously formed by using a typical electrophotographic photoreceptor that has an inorganic protection layer, cracks are sometimes generated in the inorganic protection layer due to, for example, the contact pressure with a carrier, etc. When a cracked portion of the inorganic protection layer is electrified, charges tend to accumulate on the surface of the charge transport layer. As a result, due to the accumulated charges, the charge amount increases locally, and, thus, there arises a tendency in which the image density locally increases as a result of image formation (this phenomenon may also be referred to as the "image density fluctuation").

Meanwhile, the electrophotographic photoreceptor of the present exemplary embodiment undergoes less image density fluctuation due to the aforementioned features even when cracking occurs due to continuous image formation. The cause for this is not necessarily clear, but is presumed to be as follows.

According to the electrophotographic photoreceptor of the first exemplary embodiment, the charge transport layer contains a binder resin and a charge transport material, and, when impedance of the charge transport layer is measured, the ratio ($C_{1Hz}/C_{10Hz}$) of the electrostatic capacitance $C_{1Hz}$ at 1 Hz to the electrostatic capacitance $C_{10Hz}$ at 10 Hz is 1.1 or less. When the electrostatic capacitance fluctuation for frequency is within the aforementioned range, which is smaller than a typical range, local accumulation of charges on the surface of the charge transport layer is inhibited despite cracks in the inorganic protection layer and repeated charging and exposure for continuous image formation. Presumably as a result, fluctuation in image density is reduced even when cracking occurs due to continuous image formation.

According to the electrophotographic photoreceptor of the second exemplary embodiment, the charge transport layer contains a binder resin and two or more charge transport materials, and the amount of the charge transport materials contained relative to the total amount of the charge transport materials and the binder resin in the charge transport layer is 10 mass % or more and 50 mass % or less. Since two or more charge transport materials are contained and interact with one another, the orientation polarization tends to become uniform. In addition, since the amount of the charge transport materials contained relative to the total amount of the charge transport materials and the binder resin in the charge transport layer is 50 mass % or less, less charges are accumulated. Furthermore, since the amount of the charge transport materials contained relative to the total amount of the charge transport materials and the binder resin in the charge transport layer is 10 mass % or more, sufficient charge transporting performance is easily obtained. Presumably as a result, fluctuation in image density is reduced even when cracking occurs due to continuous image formation.

The electrophotographic photoreceptor of the present exemplary embodiment will now be described in detail with reference to the drawings. In the drawings, the same or corresponding parts are represented by the same reference signs, and redundant descriptions are avoided.

FIG. 1 is a schematic cross-sectional view of one example of the layer structure of an electrophotographic photoreceptor of the present exemplary embodiment. A photoreceptor 107A has a structure in which an undercoat layer 101 is formed on a conductive substrate 104, and in which a charge generation layer 102, a charge transport layer 103, and an inorganic protection layer 106 are sequentially formed on the undercoat layer 101. The photoreceptor 107A includes a function-separated organic photosensitive layer 105 constituted by the charge generation layer 102 and the charge transport layer 103.

An intermediate layer may be disposed between the conductive substrate 104 and the undercoat layer 101.

Individual elements constituting the electrophotographic photoreceptor will now be described. Here, reference signs are omitted as appropriate.

Charge Transport Layer

The charge transport layer of the first exemplary embodiment contains a binder resin and a charge transport material, and, when impedance of the charge transport layer is measured, the ratio ($C_{1Hz}/C_{10Hz}$) of the electrostatic capacitance $C_{1Hz}$ at 1 Hz to the electrostatic capacitance $C_{10Hz}$ at 10 Hz is 1.1 or less.

The charge transport layer of the second exemplary embodiment contains a binder resin and two or more charge transport materials, and the amount of the charge transport materials contained relative to the total amount of the charge transport materials and the binder resin in the charge transport layer is 10 mass % or more and 50 mass % or less.

The charge transport layer of the present exemplary embodiment is disposed on the charge generation layer described below.

Properties of Charge Transport Layer

Electrostatic Capacitance

When the impedance of the charge transport layer of the first exemplary embodiment is measured, the ratio ($C_{1Hz}/C_{10Hz}$) of the electrostatic capacitance $C_{1Hz}$ (pF) at 1 Hz to the electrostatic capacitance $C_{10Hz}$ (pF) at 10 Hz is 1.1 or less. From the viewpoint of further reducing the image density fluctuation in the event of cracking due to continuous image formation, this ratio is preferably 1.0 or more and 1.1 or less and more preferably 1.0 or more and 1.08 or less.

For the charge transport layer of the second exemplary embodiment, from the viewpoint of further reducing the image density fluctuation in the event of cracking due to continuous image formation, the ratio ($C_{1Hz}/C_{10Hz}$) of the electrostatic capacitance $C_{1Hz}$ (pF) at 1 Hz to the electrostatic capacitance $C_{10Hz}$ (pF) at 10 Hz in impedance measurement is preferably 1.1 or less, more preferably 1.0 or more and 1.1 or less, and yet more preferably 1.0 or more and 1.08 or less.

The ratio ($C_{1Hz}/C_{10Hz}$) of the electrostatic capacitance $C_{1Hz}$ (pF) at 1 Hz to the electrostatic capacitance $C_{10Hz}$ (pF) at 10 Hz in the aforementioned impedance measurement has the same meaning as the "ratio ($\varepsilon_{r\_1Hz}/\varepsilon_{r\_10Hz}$) of the relative permittivity $\varepsilon_{r\_1Hz}$ at 1 Hz to the relative permittivity $\varepsilon_{r\_10Hz}$ at 10 Hz". Specifically, for example, when the electrode area is 06 mm and the thickness of the charge transport layer is 20 μm, the electrostatic capacitance C, the vacuum permittivity so, the permittivity $\varepsilon_r$, the electrode area S, and the thickness d of the dielectric have the following relationship:

$$C=\varepsilon_o\varepsilon_r \times S/d$$

From the viewpoint of further reducing the image density fluctuation in the event of cracking due to continuous image formation, the charge transport layer of the present exemplary embodiment preferably has an electrostatic capacitance $C_{1Hz}$ at 1 Hz of 24 pF of more and 60 pF or less, more preferably 26 pF or more and 40 pF or less, and yet more preferably 28 pF or more and 38 pF or less in impedance measurement.

From the viewpoint of further reducing the image density fluctuation in the event of cracking due to continuous image formation, the charge transport layer of the present exemplary embodiment preferably has an electrostatic capacitance $C_{10Hz}$ at 10 Hz of 24 pF of more and 62 pF or less, more preferably 28 pF or more and 56 pF or less, and yet more preferably 30 pF or more and 54 pF or less in impedance measurement.

$C_{1Hz}$, $C_{10Hz}$, and the ratio ($C_{1Hz}/C_{10Hz}$) are determined as follows.

1. A layer, such as an inorganic protection layer, that overlays and covers the charge transport layer of an electrophotographic photoreceptor to be measured is removed by polishing using, for example, a polishing sheet to expose the charge transport layer. Next, a gold electrode is formed on the exposed charge transport layer by a method such as a vacuum vapor deposition method or a sputtering method to prepare a measurement sample.
2. A gold electrode that serves as a counter electrode having a diameter ϕ of 6 mm is formed on an outer peripheral surface of the measurement sample by a vacuum vapor deposition method.
3. The impedance is measured at a frequency of 1 Hz and a frequency of 10 Hz by using an impedance analyzer, model 126096W, produced by Solartron Metrology to determine the electrostatic capacitances C described above. The measurement conditions other than the frequency are normal temperature, normal humidity ((22° C./50% RH), DC bias (DC application voltage): 0 V, AC (AC application voltage): ±1 V.
4. The obtained electrostatic capacitance $C_{1Hz}$ at 1 Hz and electrostatic capacitance $C_{10Hz}$ at 10 Hz are used to determine the ratio ($C_{1Hz}/C_{10Hz}$).

The measures for adjusting the ratio ($C_{1Hz}/C_{10Hz}$) to be within the aforementioned range are not particularly limited, and examples thereof include a method that involves adjusting the amount of the charge transport material contained relative to the total amount of the charge transport materials and the binder resin in the charge transport layer, and a method that involves using two or more charge transport materials.

Surface Roughness Ra

The surface roughness Ra (arithmetic mean surface roughness Ra) of an inorganic protection layer-side surface of the charge transport layer is, for example, 0.06 μm or less, preferably 0.03 μm or less, and more preferably 0.02 μm or less.

When the surface roughness Ra is within the aforementioned range, the smoothness and flatness of the inorganic protection layer are enhanced, and the cleaning performance is improved.

An example of the method for adjusting the surface roughness Ra to be within the aforementioned range is a method that involves increasing the thickness of the layer.

The surface roughness Ra is measured as follows.

First, the inorganic protection layer is removed to expose the layer to be measured. Next, a portion of the layer is cut out with a cutter, for example, to obtain a measurement sample.

The measurement sample is then analyzed with a stylus-type surface roughness meter (for example, Surfcom 1400A produced by TOKYO SEIMITSU CO., LTD.) to measure the surface roughness. The measurement conditions are in compliance with JIS B 0601-1994, namely, evaluation length Ln=4 mm, sampling length L=0.8 mm, and cut-off value=0.8 mm.

Thickness

The thickness of the charge transport layer is, for example, 10 μm or more and 40 μm or less, preferably 10 μm or more and 35 μm or less, and more preferably 15 μm or more and 35 μm or less.

When the thickness of the charge transport layer is within this range, the residual potential is easily reduced.

Materials for Charge Transport Layer

The charge transport layer of the first exemplary embodiment contains a binder resin and a charge transport material.

The charge transport layer of the second exemplary embodiment contains a binder resin and two or more charge transport materials.

The charge transport layer of the present exemplary embodiment may contain, in addition to the binder resin and the charge transport materials, inorganic particles and known additives, for example.

Materials for Charge Transport Layer

Examples of the charge transport material include electron transport compounds such as quinone compounds such as p-benzoquinone, chloranil, bromanil, and anthraquinone; tetracyanoquinodimethane compounds; fluorenone compounds such as 2,4,7-trinitrofluorenone; xanthone compounds; benzophenone compounds; cyanovinyl compounds; and ethylene compounds.

Other examples of the charge transport material include hole transport compounds such as triarylamine compounds, benzidine compounds, arylalkane compounds, aryl-substituted ethylene compounds, stylbene compounds, anthracene compounds, and hydrazone compounds.

From the viewpoint of further reducing the image density fluctuation in the event of cracking due to continuous image formation, the charge transport material may contain at least one selected from triarylamine derivatives represented by structural formula (a-1) below and benzidine derivatives represented by structural formula (a-2) below.

In particular, from the viewpoint of further reducing the image density fluctuation in the event of cracking due to continuous image formation, both a triarylamine derivative represented by structural formula (a-1) below and a benzidine derivative represented by structural formula (a-2) below may be contained as the charge transport materials in the charge transport layer of the second exemplary embodiment.

(a-1)

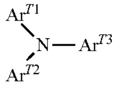

In structural formula (a-1), $Ar^{T1}$, $Ar^{T2}$, and $Ar^{T3}$ each independently represent a substituted or unsubstituted aryl group, $—C_6H_4—C(R^{T4})═C(R^{T5})(R^{T6})$, or $—C_6H_4—CH═CH—CH═C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent for each of the groups described above include a halogen atom, an alkyl group having 1 to 5 carbon atoms, and an alkoxy group having 1 to 5 carbon atoms. Examples of the substituent for each of the groups described above also include substituted amino groups each of which is substituted with an alkyl group having 1 to 3 carbon atoms.

(a-2)

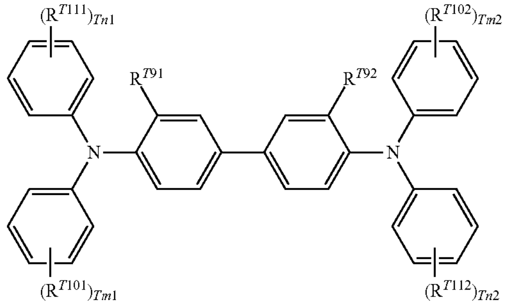

In structural formula (a-2), $R^{T91}$ and $R^{T92}$ each independently represent a hydrogen atom, a halogen atom, an alkyl group having 1 to 5 carbon atoms, or an alkoxy group having 1 to 5 carbon atoms. $R^{T11}$, $R^{T12}$, $R^{T11}$, and $R^{T12}$ each independently represent a halogen atom, an alkyl group having 1 to 5 carbon atoms, an alkoxy group having 1 to 5 carbon atoms, an amino group substituted with an alkyl group having 1 or 2 carbon atoms, a substituted or unsubstituted aryl group, $—C(R^{T12})═C(R^{T13})(R^{T14})$, or $—CH═CH—CH═C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or more and 2 or less.

Examples of the substituent for each of the groups described above include a halogen atom, an alkyl group having 1 to 5 carbon atoms, and an alkoxy group having 1 to 5 carbon atoms. Examples of the substituent for each of the groups described above also include substituted amino groups each of which is substituted with an alkyl group having 1 to 3 carbon atoms.

Among the triarylamine derivatives represented by structural formula (a-1) above and the benzidine derivatives represented by structural formula (a-2) above, a triarylamine derivative having "$—C_6H_4—CH═CH—CH═C(R^{T7})(R^{T8})$" and a benzidine derivative having "$—CH═CH—CH═C(R^{T15})(R^{T16})$" are particularly preferable from the viewpoint of further reducing the image density fluctuation in the event of cracking due to continuous image formation and from the viewpoint of charge mobility.

From the viewpoint of further reducing the image density fluctuation in the event of cracking due to continuous image formation, the charge transport material preferably contains a charge transport material having a molecular weight of 850 or less, more preferably 50 or more and 600 or less, and yet more preferably 90 or more and 550 or less.

Specific examples of the charge transport material are described below but do not limit the charge transport material of the present exemplary embodiment.

HT-1

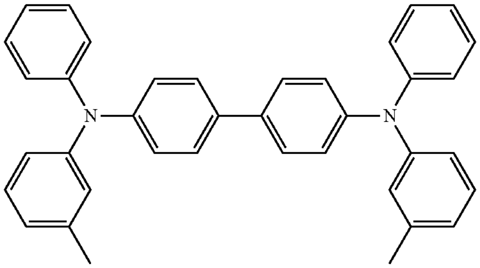

HT-2

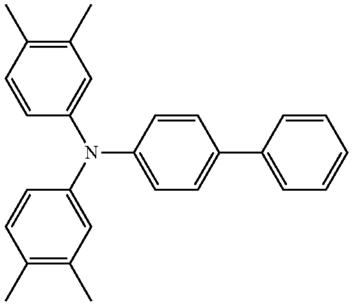

HT-3

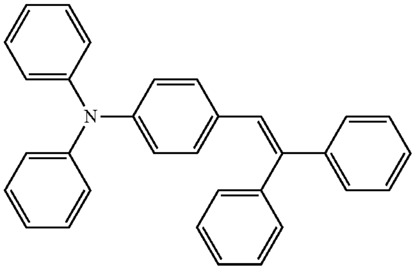

HT-4

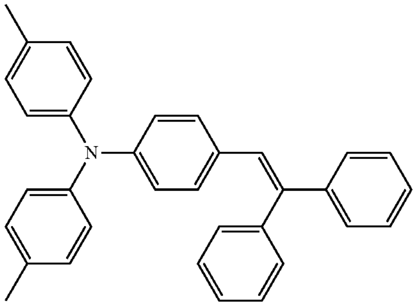

-continued
HT-5
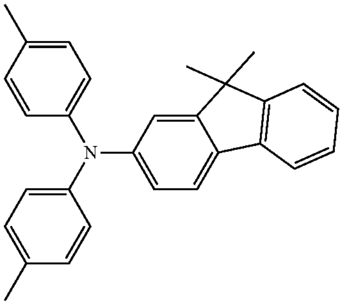
HT-6
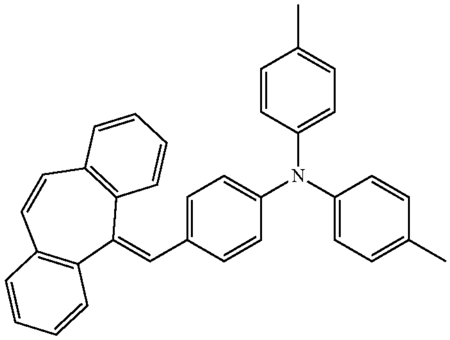
HT-7
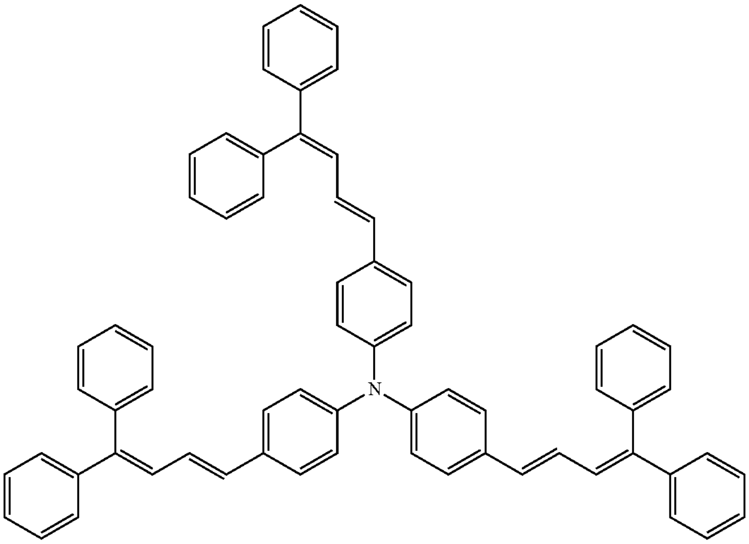
HT-8
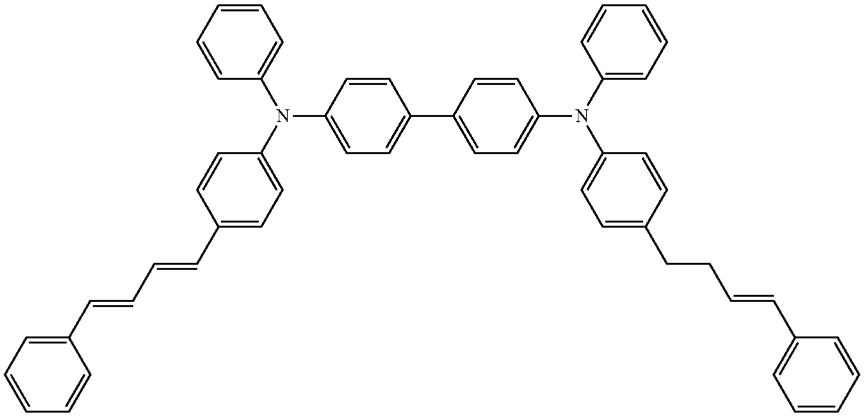
HT-9
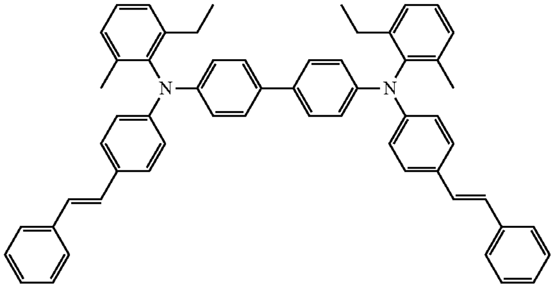
HT-10
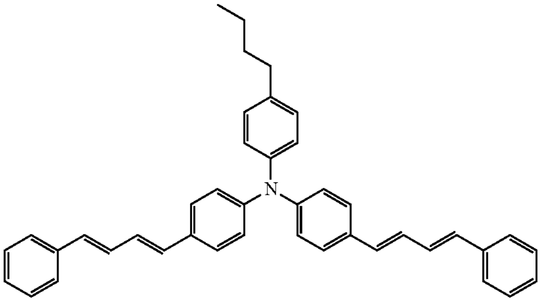

For example, when two charge transport materials, that is, one triarylamine derivative selected from those represented by structural formula (a-1) and one benzidine derivative selected from those represented by structural formula (a-2), are contained, the blend ratio of the two derivatives is not particularly limited. For example, from the viewpoint of further reducing the image density fluctuation in the event of cracking due to continuous image formation, the ratio (one triarylamine derivatives selected from those represented by structural formula (a-1)/one benzidine derivative selected from those represented by structural formula (a-2)) is preferably 10/1 or more and 1/10 or less, more preferably 5/1 or more and 1/5 or less, and yet more preferably 2/1 or more and 1/2 or less.

From the viewpoint of further reducing the image density fluctuation in the event of cracking due to continuous image formation, the amount of the charge transport material contained in the charge transport layer of the first exemplary embodiment relative to the total amount of the charge transport materials and the binder resin in the charge transport layer is preferably 10 mass % or more and 50 mass % or less, more preferably 20 mass % or more and 40 mass % or less, and yet more preferably 25 mass % or more and 40 mass % or less.

The amount of the charge transport materials contained in the charge transport layer of the second exemplary embodiment relative to the total amount of the charge transport materials and the binder resin in the charge transport layer is preferably 10 mass % or more and 50 mass % or less, and, from the viewpoint of further reducing the image density fluctuation in the event of cracking due to continuous image formation, the amount may be 20 mass % or more and 40 mass % or less and more preferably 25 mass % or more and 40 mass % or less.

In another mode, from the viewpoint of further reducing the image density fluctuation in the event of cracking due to continuous image formation, the charge transport layer of the present exemplary embodiment may contain a triarylamine derivative represented by structural formula (a-1) as a charge transport material, and the ratio ($C_{1Hz}/C_{10Hz}$) may be 1.0 or more and 1.08 or less or the amount of the charge transport material contained relative to the total amount of the charge transport materials and the binder resin in the charge transport layer may be 25 mass % or more and 40 mass % or less.

Binder Resin

Specific examples of the binder resin include polycarbonate resins (homopolymers of bisphenol A, bisphenol Z, bisphenol C, and bisphenol TP, and copolymers thereof), polyarylate resins, polyester resins, methacrylic resins, acrylic resins, polyvinyl chloride resins, polyvinylidene chloride resins, polystyrene resins, acrylonitrile-styrene copolymers, acrylonitrile-butadiene copolymers, polyvinyl acetate resins, styrene-butadiene copolymers, vinyl chloride-vinyl acetate copolymers, vinyl chloride-vinyl acetate-maleic anhydride copolymers, silicone resins, silicone-alkyd resins, phenol-formaldehyde resins, styrene-acryl copolymers, styrene-alkyd resins, poly-N-vinylcarbazole resins, polyvinyl butyral resins, and polyphenylene ether resins. One binder resin may be used alone or two or more binder resins may be used in combination.

The blend ratio of the charge transport material to the binder resin may be 10:1 to 1:5 in terms of mass ratio.

Of the binder resins described above, a polycarbonate resin (a homopolymer of bisphenol A, bisphenol Z, bisphenol C, or bisphenol TP or a copolymer thereof) may be used. One polycarbonate resin may be used alone or two or more polycarbonate resins may be used in combination. From the same viewpoint, a homopolymer-type polycarbonate resin of bisphenol Z is more preferably contained among the polycarbonate resins.

The binder resin may have, for example, a viscosity-average molecular weight of 50000 or less. The viscosity-average molecular weight may be 45000 or less or may be 35000 or less. The lower limit of the viscosity-average molecular weight may be 20000 or more from the viewpoint of retaining the binder resin properties.

The following one-point measurement method is used to measure the viscosity-average molecular weight of the binder resin.

First, from a photoreceptor to be measured, the inorganic protection layer is removed to expose the charge transport layer to be measured. Then a portion of the charge transport layer is machined to obtain a measurement sample.

Next, the binder resin is extracted from the measurement sample. In 100 $cm^3$ of methylene chloride, 1 g of the extracted binder resin is dissolved, and the specific viscosity $\eta sp$ is measured with a Ubbelohde viscometer in a 25° C. measurement environment. Then the intrinsic viscosity $[\eta]$ ($cm^3/g$) is determined from the relationship formula: $\eta sp/c=[\eta]+0.45\ [\eta]^2c$ (where c represents the concentration ($g/cm^3$)), and the viscosity-average molecular weight My is determined from the formula given by H. Schnell, $[\eta]=1.23\times 10^{-4}\ Mv^{0.83}$.

Inorganic Particles

Examples of the inorganic particles include silica particles, alumina particles, titanium oxide particles, calcium carbonate particles, magnesium carbonate particles, tricalcium phosphate particles, and cerium oxide particles. One type of inorganic particles may be used, or two or more types of inorganic particles may be used in combination.

Among the aforementioned inorganic particles, silica particles may be contained in the charge transport layer of the present exemplary embodiment from the viewpoint of further reducing the image density fluctuation in the event of cracking due to continuous image formation.

The amount of the silica particles relative to the total amount of the inorganic particles is preferably 90 mass % or more and 100 mass % or less, more preferably 98 mass % or more and 100 mass % or less, and yet more preferably 100 mass %.

From the viewpoint of further reducing the image density fluctuation in the event of cracking due to continuous image formation, the amount of the inorganic particles relative to the total solid content of the charge transport layer is preferably 30 mass % or more and 70 mass % or less, more preferably 50 mass % or more and 70 mass % or less, and yet more preferably 60 mass % or more and 70 mass % or less.

The silica particles may be dry-process silica particles or wet-process silica particles.

Examples of the dry-process silica particles include pyrogenic silica (fumed silica) prepared by burning a silane compound, and deflagration silica particles prepared by deflagration of metal silicon powder.

Examples of the wet-process silica particles include wet-process silica particles obtained by neutralization reaction of sodium silicate and a mineral acid (precipitated silica synthesized and aggregated under alkaline conditions and gel silica particles synthesized and aggregated under acidic conditions), colloidal silica particles obtained by alkalifying and polymerizing acidic silicate (silica sol particles), and sol-gel silica particles obtained by hydrolysis of an organic silane compound (for example, alkoxysilane).

Among these, pyrogenic silica particles having fewer surface silanol groups and a low gap structure may be used as the silica particles from the viewpoint of suppressing generation of residual potential etc.

The volume-average particle diameter of the silica particles may be, for example, 20 nm or more and 200 nm or less. The lower limit of the volume-average particle diameter of the silica particles may be 40 nm or more, or 50 nm or more. The lower limit of the volume-average particle diameter of the silica particles may be 150 nm or less, 120 nm or less, or 110 nm or less.

The volume-average particle diameter of the silica particles is measured by separating the silica particles from the layer, observing 100 primary particles of these silica particles with a scanning electron microscope (SEM) at a magnification of 40000, measuring the longest axis and the shortest axis of each particle by image analysis of the primary particles, and measuring the sphere-equivalent diameter from the intermediate values. The 50% diameter (D50v) in the accumulative frequency of the obtained sphere-equivalent diameters is determined, and assumed to be the volume-average particle diameter of the silica particles.

The silica particles may be surface-treated with a hydrophobizing agent. As a result, the number of silanol groups on the surfaces of the silica particles is decreased, and occurrence of residual potential is smoothly suppressed.

Examples of the hydrophobizing agent include known silane compounds such as chlorosilane, alkoxysilane, and silazane.

Among these, a silane compound having a trimethylsilyl group, a decylsilyl group, or a phenylsilyl group may be used as the hydrophobizing agent from a viewpoint of smoothly suppressing occurrence of residual potential. In other words, trimethylsilyl groups, decylsilyl groups or phenylsilyl groups may be present on the surfaces of the silica particles.

Examples of the silane compound having trimethylsilyl groups include trimethylchlorosilane, trimethylmethoxysilane, and 1,1,1,3,3,3-hexamethyldisilazane.

Examples of the silane compound having decylsilyl groups include decyltrichlorosilane, decyldimethylchlorosilane, and decyltrimethoxysilane.

Examples of the silane compound having phenylsilyl groups include triphenylmethoxysilane and triphenylchlorosilane.

The condensation ratio of hydrophobized silica particles (the ratio of Si—O—Si in the $SiO_4$— bonds in the silica particles, hereinafter this ratio may be referred to as "condensation ratio of the hydrophobizing agent") may be, for example, 90% or more, 91% or more, or 95% or more relative to the silanol groups on the surfaces of the silica particles. When the condensation ratio of the hydrophobizing agent is within the above-described range, the number of silanol groups on the surfaces of the silica particles is further decreased, and occurrence of residual potential is smoothly suppressed.

The condensation ratio of the hydrophobizing agent indicates the ratio of condensed silicon relative to all bondable sites of silicon in the condensed portions detected with NMR, and is measured as follows. First, silica particles are separated from the layer. Separated silica particles are subjected to Si CP/MAS NMR analysis with AVANCE III 400 produced by Bruker, and the peak areas corresponding to the number of SiO substituents are determined. The values for the disubstituted ($Si(OH)_2(O—Si)_2$—), trisubstituted ($Si(OH)(O—Si)_3$—), and tetrasubstituted ($Si(O—Si)_4$—) are respectively assumed to be Q2, Q3, and Q4, and the condensation ratio of the hydrophobizing agent is calculated from the formula: Q2×2+Q3×3+Q4×4)/4×(Q2+Q3+Q4).

The volume resistivity of the silica particles may be, for example, $10^{11}$ Ω·cm or more, is preferably $10^{12}$ Ω·cm or more, and is more preferably $10^{13}$ Ω·cm or more.

When the volume resistivity of the silica particles is within the above-described range, degradation of the electrical properties is reduced.

The volume resistivity of the silica particles is measured as follows. The measurement environment involves a temperature of 20° C. and a humidity of 50% RH.

First, silica particles are separated from the layer. Then, the separated silica particles to be measured are placed on a surface of a circular jig equipped with a 20 $cm^2$ electrode plate so that the silica particles form a silica particle layer having a thickness of about 1 mm or more and 3 mm or less. Another identical 20 $cm^2$ electrode plate is placed on the silica particle layer so as to sandwich the silica particle layer. In order to reduce gaps between the silica particles, a load of 4 kg is applied onto the electrode plate on the silica particle layer, and then the thickness (cm) of the silica particle layer is measured. The electrodes above and under the silica particle layer are connected to an electrometer and a high-voltage power generator. A high voltage is applied to the two electrodes so that the electric field reaches a preset value, and the current value (A) that flows at this time is read so as to calculate the volume resistivity (Ωcm) of the silica particles. The calculation formula of the volume resistivity (Ωcm) of the silica particles is as follows.

Note that in the formula, ρ represents the volume resistivity (Ωcm) of the silica particles, E represents the applied voltage (V), I represents the current value (A), $I_0$ represents a current value (A) at an applied voltage of 0 V, and L represents the thickness (cm) of the silica particle layer. For evaluation, the volume resistivity at an applied voltage of 1000 V is used.

$$\rho = E\times 20/(I-I_0)/L \qquad \text{Formula:}$$

Formation of Charge Transport Layer

The charge transport layer may be formed by any known method, and, for example, may be formed by preparing a charge transport layer-forming solution by adding the above-mentioned components to a solvent, forming a coating film of this solution, and drying and, if desired, heating the coating film.

Examples of the solvent used to prepare the charge transport layer-forming solution include common organic solvents such as aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in combination as a mixture.

Examples of the method for applying the charge transport layer-forming solution to the charge generation layer include common methods such as a blade coating method, a wire bar coating method, a spray coating method, a dip coating method, a bead coating method, an air knife coating method, and a curtain coating method.

When particles (for example, silica particles or fluororesin particles) are to be dispersed in the charge transport layer-forming solution, a dispersing method that uses, for example, a media disperser such as a ball mill, a vibrating ball mill, an attritor, a sand mill, or a horizontal sand mill, or a media-less disperser such as stirrer, an ultrasonic disperser, a roll mill, or a high-pressure homogenizer is employed. Examples of the high-pressure homogenizer include a collision-type homogenizer in which a dispersion in a high-pressure state is dispersed through liquid-liquid collision or liquid-wall collision, and a penetration-type homogenizer in which a fluid in a high-pressure state is caused to penetrate through fine channels.

Inorganic Protection Layer

Composition of Inorganic Protection Layer

The inorganic protection layer is a layer that contains an inorganic material.

From the viewpoint of the mechanical strength and light transmittance sufficient for a protection layer, examples of the inorganic material include oxide, nitride, carbon, and silicon inorganic materials.

Examples of the oxide inorganic material include metal oxides such as gallium oxide, aluminum oxide, zinc oxide, titanium oxide, indium oxide, tin oxide, and boron oxide, and mixed crystals thereof.

Examples of the nitride inorganic material include metal nitrides such as gallium nitride, aluminum nitride, zinc nitride, titanium nitride, indium nitride, tin nitride, and boron nitride, and mixed crystals thereof.

Examples of the carbon and silicon inorganic materials include diamond-like carbon (DLC), amorphous carbon (a-C), hydrogenated amorphous carbon (a-C:H), hydrogenated and fluorinated amorphous carbon (a-C:F:H), amorphous silicon carbide (a-SiC), hydrogenated amorphous silicon carbide (a-SiC:H), amorphous silicon (a-Si), and hydrogenated amorphous silicon (a-Si:H).

The inorganic material may be a mixed crystal of oxide and nitride inorganic materials.

Among these, a metal oxide, in particular, an oxide of a group 13 element (in particular, gallium oxide), may be used as the inorganic material from the viewpoints of excellent mechanical strength and light-transmittance, n-type conductivity, and conductivity controllability.

The inorganic protection layer exhibits enhanced hydrophobicity by containing a group 13 element (in particular, gallium) and oxygen. Due to high hydrophobicity, the cleaning performance of the cleaning blade is improved.

As mentioned above, the inorganic protection layer may contain at least a group 13 element (in particular, gallium) and oxygen, and may further contain hydrogen if necessary. When hydrogen is contained, various physical properties of the inorganic protection layer containing at least a group 13 element (in particular, gallium) and oxygen can be easily controlled. For example, in an inorganic protection layer that contains gallium, oxygen, and hydrogen (for example, an inorganic protection layer composed of hydrogen-containing gallium oxide), changing the [O]/[Ga] composition ratio from 1.0 to 1.5 can easily control the volume resistivity within the range of $10^9$ Ω·cm or more and $10^{14}$ Ω·cm or less.

To control the conductivity type, the inorganic protection layer may contain, in addition to the inorganic material, at least one element selected from C, Si, Ge, and Sn to achieve n-type, for example. To make a p-type inorganic protection layer, at least one element selected from N, Be, Mg, Ca, and Sr may be contained.

When the inorganic protection layer formed is composed of gallium, oxygen, and, if needed, hydrogen, possible element constitutional ratios are as follows from the viewpoint of excellent mechanical strength, light transmittance, flexibility, and conduction controllability: The element constitutional ratio for gallium relative to all elements constituting the inorganic protection layer may be, for example, 15 atom % or more and 50 atom % or less, may be 20 atom % or more and 40 atom % or less, or may be 20 atom % or more and 30 atom % or less.

The element constitutional ratio for oxygen relative to all elements constituting the inorganic protection layer may be, for example, 30 atom % or more and 70 atom % or less, may be 40 atom % or more and 60 atom % or less, or may be 45 atom % or more and 55 atom % or less.

The element constitutional ratio for hydrogen relative to all elements constituting the inorganic protection layer may be, for example, 10 atom % or more and 40 atom % or less, may be 15 atom % or more and 35 atom % or less, or may be 20 atom % or more and 30 atom % or less.

Meanwhile, the [oxygen/gallium] atom ratio may be more than 1.00 but not more than 2.00, or may be 1.10 or more and 1.90 or less.

Identification of the elements, the element constitutional ratios, the atom ratios, etc., of the elements in the inorganic protection layer, as well as the distribution in the thickness direction, are determined by Rutherford back-scattering (hereinafter, referred to as "RBS").

In RBS, 3SDH Pelletron produced by National Electrostatics Corp., is used as an accelerator, RBS-400 produced by CE&A is used as an end station, and 3S-R10 is used as the system. HYPRA program produced by CE&A etc., are used for analysis.

Regarding the RBS measurement conditions, He++ ion beam energy is 2.275 eV, detection angle is 160°, and the grazing angle with respect to the incident beam is about 109°.

The specific procedure for RBS measurement is as follows.

First, a He++ ion beam is applied perpendicular to the sample, the detector is set at 160° with respect to the ion beam, and back-scattered He signals are measured. The compositional ratio and the film thickness are determined from the detected He energy and intensity. In order to improve accuracy of determining the compositional ratio and the film thickness, the spectrum may be measured by using two detection angles. The accuracy is improved by measuring at two detection angles of different resolutions in the depth direction or different back-scattering dynamics, and cross-checking the results.

The number of He atoms back-scattered by the target atoms is determined by three factors: 1) the atomic number of the target atoms, 2) the energy of the He atoms before scattering, and 3) the scattering angle.

The density is assumed from the measured composition by calculation, and the assumed value of density is used to calculate the thickness. The error in density is within 20%.

The element constitutional ratio for hydrogen is determined by hydrogen forward scattering (hereinafter, referred to as "HFS").

In HFS measurement, 3SDH Pelletron produced by National Electrostatics Corp., is used as an accelerator, RBS-400 produced by CE&A is used as an end station, and 3S-R10 is used as the system. HYPRA program produced by CE&A is used for analysis. The HFS measurement conditions are as follows.

He++ ion beam energy: 2.275 eV

Detection angle: 160°

Grazing angle with respect to incident beam: 30°

In HFS measurement, the detector is set at 30° with respect to the He++ ion beam, and the sample is set at 75° with respect to the normal line so as to pick up signals from hydrogen scattered forward from the sample. During this process, the detector may be covered with an aluminum foil to remove He atoms that scatter along with the hydrogen atoms. The quantitative determination is carried out by normalizing the hydrogen counts from reference samples and the measurement sample with a stopping power, and then comparing the results. As the reference samples, a sample prepared by ion-implanting H into Si, and white mica are used.

White mica is known to have a hydrogen concentration of 6.5 atom %.

For H atoms adsorbing to the outermost surface, for example, correction is implemented by subtracting the amount of H adsorbing to a clean Si surface.

Properties of Inorganic Protection Layer

The inorganic protection layer may have a distribution of compositional ratio in the thickness direction or may have a multilayer structure depending on the purpose.

The inorganic protection layer may be a non-single-crystal film such as a microcrystalline film, a polycrystal film, or an amorphous film. Among these, an amorphous film may be used for its flatness and smoothness of the surface, and a microcrystalline film may be used from the viewpoint of hardness.

The growth section of the inorganic protection layer may have a columnar structure; however, from the viewpoint of slippage, a structure having high flatness may be employed, or an amorphous structure may be employed.

The crystallinity and amorphousness are identified by the absence or presence of dots and lines in a diffraction image obtained by reflection high energy electron diffraction (RHEED) measurement.

The volume resistivity of the inorganic protection layer may be $10^6$ Ω·cm or more and is preferably $10^8$ Ω·cm or more.

At a volume resistivity within this range, flow of charges in the in-plane direction is reduced, and a good electrostatic latent image is easily formed.

The volume resistivity is determined by calculation from a resistance value measured with LCR meter ZM2371 produced by NF Corporation at a frequency of 1 kHz and a voltage of 1 V on the basis of the electrode area and the sample thickness.

The measurement sample may be a sample obtained by forming a film on an aluminum substrate under the same conditions as those for forming the inorganic protection layer to be measured, and forming a gold electrode on the formed film by vacuum vapor deposition. Alternatively, the measurement sample may be a sample prepared by separating the inorganic protection layer from an already made electrophotographic photoreceptor, etching some part of the inorganic protection layer, and interposing the etched layer between a pair of electrodes.

The elastic modulus of the inorganic protection layer may be 30 GPa or more and 80 GPa or less and is preferably 40 GPa or more and 65 GPa or less.

At an elastic modulus within this range, denting, separation, and cracking in the inorganic protection layer is easily suppressed.

The elastic modulus is determined by obtaining a depth profile with Nano Indenter SA2 produced by MTS Systems Corporation by continuous stiffness measurement (CSM) (U.S. Pat. No. 4,848,141) and calculating the average of values observed at an indentation depth of 30 nm to 100 nm. The measurement conditions are as follows.

Measurement environment: 23-C, 55% RH

Indenter used: diamond regular three-sided pyramid indenter (Berkovic indenter)

Test mode: CSM mode

The measurement sample may be a sample prepared by forming a film on a substrate under the same conditions as those for forming the inorganic protection layer to be measured, or a sample prepared by separating the inorganic protection layer from an already prepared electrophotographic photoreceptor and etching the separated inorganic protection layer.

The thickness of the inorganic protection layer may be, for example, 0.2 μm or more and 10.0 μm or less and is preferably 0.4 μm or more and 5.0 μm or less.

At a thickness within this range, denting, separation, and cracking in the inorganic protection layer is easily suppressed.

Formation of Inorganic Protection Layer

The inorganic protection layer is formed by, for example, a known gas-phase film forming method such as a plasma chemical vapor deposition (CVD) method, an organic metal gas-phase growth method, a molecular beam epitaxy method, a vapor deposition method, or a sputtering method.

Formation of the inorganic protection layer will now be described through specific examples with reference to the drawings illustrating some examples of the film forming apparatus. Although the description below is directed to a method for forming an inorganic protection layer containing gallium, oxygen, and hydrogen, the method is not limited to this, and any known forming method may be applied depending on the composition of the inorganic protection layer to be obtained.

Figure 2A:
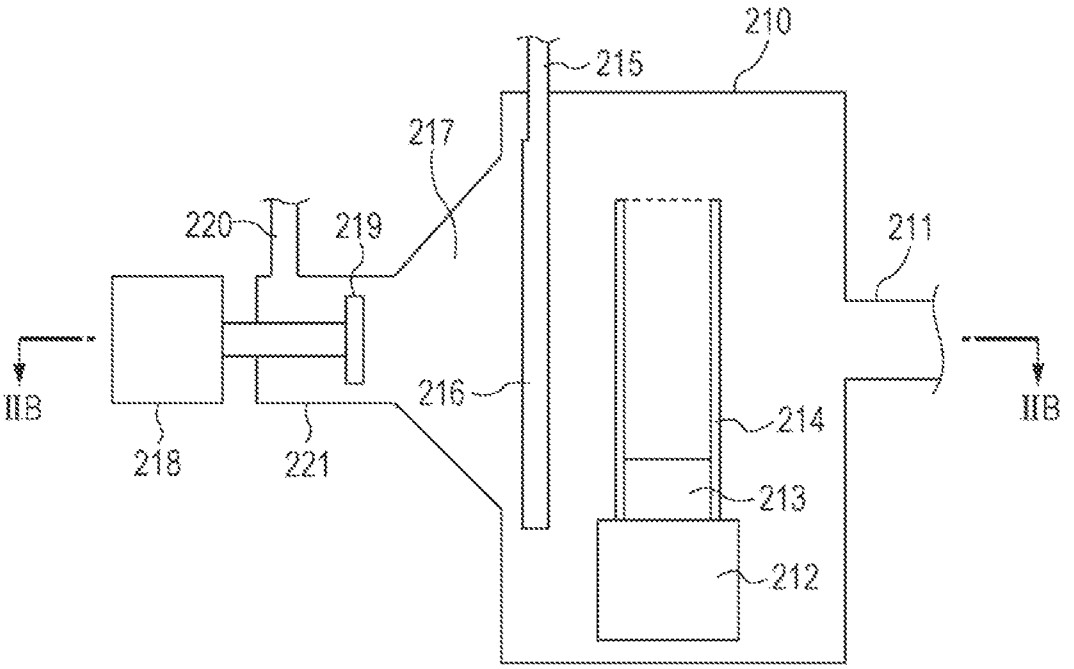
FIGS. 2A and 2B are each a schematic diagram of one example of a film forming apparatus used in forming an inorganic protection layer of the electrophotographic photoreceptor of the exemplary embodiment.
Figure 2B:
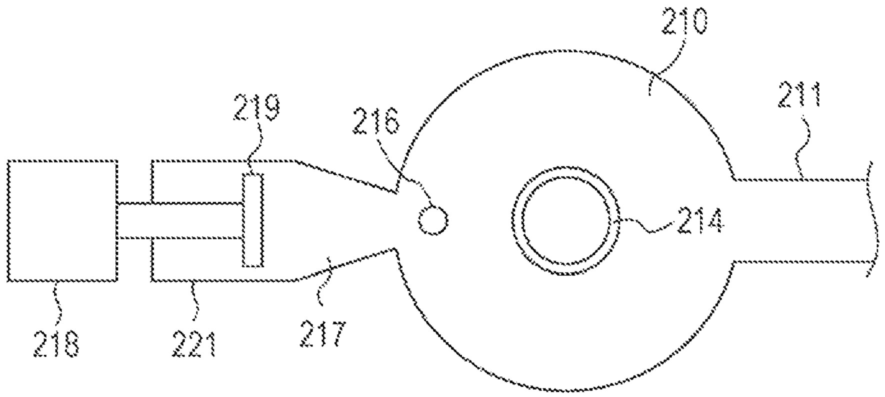

FIGS. 2A and 2B are each a schematic diagram illustrating one example of a film-forming apparatus used to form an inorganic protection layer of the electrophotographic photoreceptor of the exemplary embodiment. FIG. 2A is a schematic side sectional view of the film forming apparatus, and FIG. 2B is a schematic sectional view of the film forming apparatus illustrated in FIG. 2A taken along line IIB-IIB. In FIGS. 2A and 2B, reference numeral 210 denotes a deposition chamber, 211 denotes an exhaust port, 212 denotes a substrate rotating unit, 213 denotes a substrate supporting member, 214 denotes a substrate, 215 denotes a gas inlet duct, 216 denotes a shower nozzle having an opening through which gas, which is introduced from the gas inlet duct 215, is jet out, 217 denotes a plasma diffusing area, 218 denotes a high-frequency power supply unit, 219 denotes a flat plate electrode, 220 denotes a gas inlet duct, and 221 denotes a high-frequency discharge tube unit.

In the film forming apparatus illustrated in FIGS. 2A and 2B, the exhaust port 211 connected to a vacuum evacuator (not illustrated) is installed on one end of the deposition chamber 210. A plasma generator constituted by the high-frequency power supply unit 218, the flat plate electrode 219, and the high-frequency discharge tube unit 221 is installed on the side opposite to the side where the exhaust port 211 of the deposition chamber 210 is formed.

This plasma generator is constituted by the high-frequency discharge tube unit 221, the flat plate electrode 219 installed inside the high-frequency discharge tube unit 221 and having a discharge surface provided on the exhaust port 211 side, and the high-frequency power supply unit 218 disposed outside the high-frequency discharge tube unit 221 and connected to the surface of the flat plate electrode 219 opposite from the discharge surface. The gas inlet duct 220 for supplying gas into the interior of the high-frequency discharge tube unit 221 is connected to the high-frequency discharge tube unit 221, and the other end of the gas inlet duct 220 is connected to a first gas supply source not illustrated in the drawing.

Figure 3:
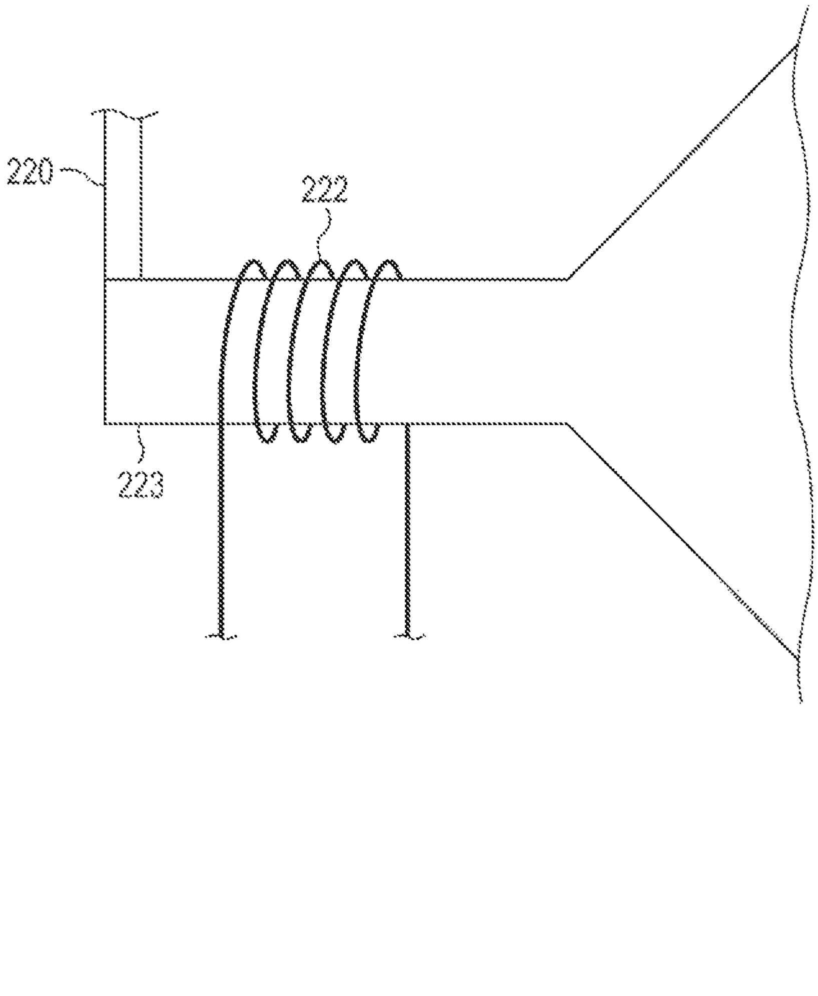
FIG. 3 is a schematic diagram of one example of a plasma generator used in forming the inorganic protection layer of the electrophotographic photoreceptor of the exemplary embodiment.

Instead of the plasma generator installed in the film forming apparatus illustrated in FIGS. 2A and 2B, a plasma generator illustrated in FIG. 3 may be used. FIG. 3 is a schematic diagram illustrating another example of the plasma generator used in the film forming apparatus illustrated in FIGS. 2A and 2B, and is a side view of the plasma generator.

In FIG. 3, reference numeral 222 denotes a high-frequency coil, 223 denotes a quartz tube, and 220 denotes the same part as that illustrated in FIGS. 2A and 2B. The plasma generator is constituted by the quartz tube 223 and the high-frequency coil 222 installed along the outer circumferential surface of the quartz tube 223. One end of the quartz tube 223 is connected to the deposition chamber 210 (not illustrated in FIG. 3). The other end of the quartz tube 223 is connected to the gas inlet duct 220 through which gas is introduced into the quartz tube 223.

In FIGS. 2A and 2B, a rod-shaped shower nozzle 216 extending along the discharge surface is connected to the discharge surface side of the flat plate electrode 219, one end of the shower nozzle 216 is connected to the gas inlet duct 215, and the gas inlet duct 215 is connected to a second gas supply source (not illustrated in the drawing) disposed outside the deposition chamber 210.

In the deposition chamber 210, the substrate rotating unit 212 is installed. A cylindrical substrate 214 is attachable to the substrate rotating unit 212 via the substrate supporting member 213 so that the longitudinal direction of the shower nozzle 216 and the axis direction of the substrate 214 face each other. In forming the film, the substrate rotating unit 212 is rotated so that the substrate 214 is rotated in the circumferential direction. The substrate 214 is, for example, a photoreceptor that includes layers up to the organic photosensitive layer stacked on top of each other.

The inorganic protection layer is formed as follows, for example.

First, oxygen gas (or helium (He)-diluted oxygen gas), helium (He) gas, and, if desirable, hydrogen (Hz) gas are introduced into the high-frequency discharge tube unit 221 from the gas inlet duct 220, and 13.56 MHz radio waves are supplied to the flat plate electrode 219 from the high-frequency power supply unit 218. During this process, the plasma diffusing area 217 that radially spreads from the discharge surface side of the flat plate electrode 219 toward the exhaust port 211 side is formed. The gas introduced from the gas inlet duct 220 flows in the deposition chamber 210 from the flat plate electrode 219 side toward the exhaust port 211 side. The flat plate electrode 219 may be surrounded by an earth shield.

Next, trimethyl gallium gas is introduced into the deposition chamber 210 through the gas inlet duct 215 and the shower nozzle 216 located downstream of the flat plate electrode 219, which is an activating unit, so as to form a non-single-crystal film that contains gallium, oxygen, and hydrogen on the surface of the substrate 214.

For example, a substrate having an organic photosensitive layer formed thereon is used as the substrate 214.

The temperature of the surface of the substrate 214 during formation of the inorganic protection layer may be 150° C. or lower, 100° C. or lower, or 30° C. or higher and 100° C. or lower since an organic photoreceptor having an organic photosensitive layer is used.

Even when the temperature of the surface of the substrate 214 is 150° or lower at the time the film formation is started, the temperature may rise to above 150° due to plasma. In such a case, the organic photosensitive layer may be damaged by heat. Thus, the surface temperature of the substrate 214 may be controlled by considering this possibility.

The temperature of the surface of the substrate 214 may be controlled by using one or both of a heating unit and a cooling unit (not illustrated in the drawing), or may be left to naturally rise during the process of discharging. When the substrate 214 is to be heated, a heater may be installed on the inner or outer side of the substrate 214. When the substrate 214 is to be cooled, a gas or liquid for cooling may be circulated on the inner side of the substrate 214.

In order to avoid elevation of the temperature of the surface of the substrate 214 due to discharging, it is effective to adjust high-energy gas flow applied to the surface of the substrate 214. In such a case, conditions such as the gas flow rate, the discharge output, and the pressure are adjusted so as to achieve a target temperature.

In addition, an organic metal compound containing aluminum or a hydride such as diborane can be used instead of trimethylgallium gas, and two or more of such materials may be mixed and used.

For example, in the initial stage of forming the inorganic protection layer, trimethylindium is introduced into the deposition chamber 210 through the gas inlet duct 215 and the shower nozzle 216 so as to form a film containing nitrogen and indium on the substrate 214. This film absorbs ultraviolet light, which is generated when film formation is continued and which deteriorates the organic photosensitive layer. Thus, damage on the organic photosensitive layer due to generation of ultraviolet light during film formation is suppressed.

Regarding the dopant doping method during film formation, $SiH_3$ or $SnH_4$ in a gas state is used for the n-type, and biscyclopentadienyl magnesium, dimethylcalcium, dimethylstrontium, or the like in a gas state is used for the p-type. In order to dope the surface layer with a dopant element, a known method, such as a thermal diffusion method or an ion implantation method, may be employed.

Specifically, for example, gas containing at least one dopant element is introduced into the deposition chamber 210 through the gas inlet duct 215 and the shower nozzle 216 so as to obtain an inorganic protection layer of an n- or p-conductivity type.

For the film forming apparatus illustrated in FIGS. 2A, 2B, and 3, active nitrogen or active hydrogen formed by discharge energy may be independently controlled by installing multiple activation devices, or gas containing both nitrogen and hydrogen atoms, such as $NH_3$, may be used. Furthermore, $H_2$ may be added. The conditions under which active hydrogen are liberated and generated from the organic metal compound may be employed.

In this manner, carbon atoms, gallium atoms, nitrogen atoms, hydrogen atoms, etc., that have been activated exist in a controlled state on the surface of the substrate 214. The activated hydrogen atoms have an effect of causing desorption of hydrogen atoms in the hydrocarbon groups, such as methyl groups and ethyl groups, constituting the organic metal compound, the hydrogen atoms taking a molecular form.

Thus, a hard film (inorganic protection layer) having three-dimensional bonds is formed.

The plasma generators for the film forming apparatus illustrated in FIGS. 2A, 2B, and 3 use a high-frequency oscillator. However, the plasma generator is not limited to this. For example, a microwave oscillator may be used, or an electrocyclotron resonance-type or helicon plasma-type device may be used. The high-frequency oscillator may be of an induction type or of a capacitance type.

Two or more of these devices may be used in combination, or two or more of the same type of devices may be used in combination. In order to suppress temperature elevation of the surface of the substrate 214 due to plasma irradiation, a high-frequency oscillator may be used. Alternatively, a device that suppresses heat irradiation may be provided.

When two or more different types of plasma generators (plasma generating units) are used, discharging may be caused to occur simultaneously at the same pressure. Alternatively, there may be a difference in pressure between a region where discharging occurs and a region where film formation is performed (portion where the substrate is installed). These devices may be arranged in series in the film forming apparatus with respect to the gas flow formed from the portion where the gas is introduced toward the portion where the gas is discharged. Alternatively, all of the devices may be arranged to oppose the film-forming surface of the substrate.

For example, when two types of plasma generators are arranged in series with respect to the gas flow in, for example, the film forming apparatus illustrated in FIGS. 2A and 2B, the shower nozzle 216 is used as an electrode of the second plasma generator to cause discharge in the deposition chamber 210. In such a case, for example, a high-frequency voltage is applied to the shower nozzle 216 via the gas inlet duct 215 so as to induce discharging in the deposition chamber 210 using the shower nozzle 216 as the electrode. Alternatively, instead of using the shower nozzle 216 as the electrode, a cylindrical electrode may be provided between the substrate 214 and the flat plate electrode 219 in the deposition chamber 210, and discharging may be induced in the deposition chamber 210 by using this cylindrical electrode.

When two different plasma generators are used at the same pressure, for example, when a microwave oscillator and a high-frequency oscillator are used, the excitation energy of the excited species can be significantly changed, and thus this is effective for controlling the quality of the film. Discharging may be performed at a pressure near the atmospheric air pressure (70000 Pa or more and 110000 Pa or less). When discharging is to be performed at a pressure near the atmospheric air pressure, He may be used as the carrier gas.

The inorganic protection layer is formed by, for example, placing the substrate 214, which includes a substrate and an organic photosensitive layer thereon, in the deposition chamber 210 and introducing mixed gases having different compositions.

Regarding the film forming conditions, for example, when discharging is performed by high-frequency discharging, the frequency may be in the range of 10 kHz or more and 50 MHz or less in order to perform high-quality film formation at low temperature. The output depends on the size of the substrate 214, but the output may be in the range of 0.01 $W/cm^2$ or more and 0.2 $W/cm^2$ or less relative to the surface area of the substrate. The speed of rotation of the substrate 214 may be in the range of 0.1 rpm or more and 1000 rpm or less.

Conductive Substrate

Examples of the conductive substrate include metal plates, metal drums, and metal belts that contain metals (aluminum, copper, zinc, chromium, nickel, molybdenum, vanadium, indium, gold, platinum, etc.) or alloys (stainless steel etc.). Other examples of the conductive substrate include paper sheets, resin films, and belts coated, vapor-deposited, or laminated with conductive compounds (for example, conductive polymers and indium oxide), metals (for example, aluminum, palladium, and gold), or alloys. Here, "conductive" means having a volume resistivity of less than $10^{13}$ Ω·cm.

The surface of the conductive substrate may be roughened to a center-line average roughness Ra of 0.04 μm or more and 0.5 μm or less in order to suppress interference fringes that occur when the electrophotographic photoreceptor used in a laser printer is irradiated with a laser beam. When incoherent light is used as a light source, there is no need to roughen the surface to reduce interference fringes, but roughening the surface suppresses generation of defects due to irregularities on the surface of the conductive substrate and thus is desirable for extending the lifetime.

Examples of the surface roughening method include a wet honing method with which an abrasive suspended in water is sprayed onto a conductive substrate, a centerless grinding with which a conductive substrate is pressed against a rotating grinding stone to perform continuous grinding, and an anodization treatment.

Another example of the surface roughening method does not involve roughening the surface of a conductive substrate but involves dispersing a conductive or semi-conductive powder in a resin and forming a layer of the resin on a surface of a conductive substrate so as to create a rough surface by the particles dispersed in the layer.

The surface roughening treatment by anodization involves forming an oxide film on the surface of a conductive substrate by anodization by using a metal (for example, aluminum) conductive substrate as the anode in an electrolyte solution. Examples of the electrolyte solution include a sulfuric acid solution and an oxalic acid solution. However, a porous anodization film formed by anodization is chemically active as is, is prone to contamination, and has resistivity that significantly varies depending on the environment. Thus, a pore-sealing treatment may be performed on the porous anodization film so as to seal fine pores in the oxide film by volume expansion caused by hydrating reaction in pressurized steam or boiling water (a metal salt such as a nickel salt may be added) so that the oxide is converted into a more stable hydrous oxide.

The thickness of the anodization film may be, for example, 0.3 μm or more and 15 μm or less. When the thickness is within this range, a barrier property against injection tends to be exhibited, and the increase in residual potential caused by repeated use tends to be suppressed.

The conductive substrate may be subjected to a treatment with an acidic treatment solution or a Boehmite treatment.

The treatment with an acidic treatment solution is, for example, conducted as follows. First, an acidic treatment solution containing phosphoric acid, chromic acid, and hydrofluoric acid is prepared. The blend ratios of phosphoric acid, chromic acid, and hydrofluoric acid in the acidic treatment solution may be, for example, in the range of 10 mass % or more and 11 mass % or less for phosphoric acid, in the range of 3 mass % or more and 5 mass % or less for chromic acid, and in the range of 0.5 mass % or more and 2 mass % or less for hydrofluoric acid; and the total concentration of these acids may be in the range of 13.5 mass % or more and 18 mass % or less. The treatment temperature may be, for example, 42° C. or higher and 48° C. or lower. The thickness of the film may be 0.3 μm or more and 15 μm or less.

The Boehmite treatment is conducted by immersing a conductive substrate in pure water at 90° C. or higher and 100° C. or lower for 5 to 60 minutes or by bringing a conductive substrate into contact with pressurized steam at 90° C. or higher and 120° C. or lower for 5 to 60 minutes.

The thickness of the film may be 0.1 μm or more and 5 μm or less. The Boehmite-treated body may be further anodized by using an electrolyte solution, such as adipic acid, boric acid, a borate salt, a phosphate salt, a phthalate salt, a maleate salt, a benzoate salt, a tartrate salt, or a citrate salt, that has low film-dissolving power.

Undercoat Layer

The undercoat layer may be, for example, a layer that contains inorganic particles and a binder resin, or a layer composed of a metal oxide.

Layer that Contains Inorganic Particles and Resin Particles

An example of the inorganic particles contained in the layer that contains inorganic particles and resin particles is inorganic particles having a powder resistance (volume resistivity) of $10^2$ Ω·cm or more and $10^{11}$ Ωcm or less.

As the inorganic particles having this resistance value, for example, metal oxide particles such as tin oxide particles, titanium oxide particles, zinc oxide particles, or zirconium oxide particles may be used, and, in particular, zinc oxide particles may be used.

The specific surface area of the inorganic particles measured by the BET method may be, for example, 10 $m^2/g$ or more.

The volume-average particle diameter of the inorganic particles may be, for example, 50 nm or more and 2000 nm or less (or may be 60 nm or more and 1000 nm or less).

The amount of the inorganic particles contained relative to the binder resin is, for example, preferably 10 mass % or more and 80 mass % or less and more preferably 40 mass % or more and 80 mass % or less.

The inorganic particles may be surface-treated. A mixture of two or more inorganic particles subjected to different surface treatments or having different particle diameters may be used.

Examples of the surface treatment agent include a silane coupling agent, a titanate coupling agent, an aluminum coupling agent, and a surfactant. In particular, a silane coupling agent is preferable, and an amino-group-containing silane coupling agent is more preferable.

Examples of the amino-group-containing silane coupling agent include, but are not limited to, 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane.

Two or more silane coupling agents may be mixed and used. For example, an amino-group-containing silane coupling agent may be used in combination with an additional silane coupling agent. Examples of this additional silane coupling agent include, but are not limited to, vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

The surface treatment method that uses a surface treatment agent may be any known method, for example, may be a dry method or a wet method.

The treatment amount of the surface treatment agent may be, for example, 0.5 mass % or more and 10 mass % or less relative to the inorganic particles.

Here, when the undercoat layer contains inorganic particles and resin particles, from the viewpoint of enhancing the long-term stability of electrical properties and the carrier-blocking properties, the undercoat layer may contain an electron-accepting compound (acceptor compound) along with the inorganic particles.

Examples of the electron-accepting compound include electron transporting substances, such as quinone compounds such as chloranil and bromanil; tetracyanoquinodimethane compounds; fluorenone compounds such as 2,4,7-trinitrofluorenone and 2,4,5,7-tetranitro-9-fluorenone; oxadiazole compounds such as 2-(4-biphenyl)-5-(4-t-butylphenyl)-1,3,4-oxadiazole, 2,5-bis(4-naphthyl)-1,3,4-oxadiazole, and 2,5-bis(4-diethylaminophenyl)-1,3,4-oxadiazole; xanthone compounds; thiophene compounds; and diphenoquinone compounds such as 3,3',5,5'-tetra-t-butyldiphenoquinone.

In particular, a compound having an anthraquinone structure may be used as the electron-accepting compound. Examples of the compound having an anthraquinone structure include hydroxyanthraquinone compounds, aminoanthraquinone compounds, and aminohydroxyanthraquinone compounds, and more specific examples thereof include anthraquinone, alizarin, quinizarin, anthrarufin, and purpurin.

The electron-accepting compound may be dispersed in the undercoat layer along with the inorganic particles, or may be attached to the surfaces of the inorganic particles.

Examples of the method for attaching the electron-accepting compound onto the surfaces of the inorganic particles include a dry method and a wet method.

The dry method is, for example, a method with which, while inorganic particles are stirred with a mixer or the like having a large shear force, an electron-accepting compound as is or dissolved in an organic solvent is added dropwise or sprayed along with dry air or nitrogen gas so as to cause the electron-accepting compound to attach to the surfaces of the inorganic particles. When the electron-accepting compound is added dropwise or sprayed, the temperature may be equal to or lower than the boiling point of the solvent. After the electron-accepting compound is added dropwise or sprayed, baking may be further conducted at 100° C. or higher. The temperature and time for baking are not particularly limited as long as the electrophotographic properties are obtained.

The wet method is, for example, a method with which, while inorganic particles are dispersed in a solvent by stirring, ultrasonically, or by using a sand mill, an attritor, or a ball mill, the electron-accepting compound is added, followed by stirring or dispersing, and then the solvent is removed to cause the electron-accepting compound to attach to the surfaces of the inorganic particles. The solvent is removed by, for example, filtration or distillation. After removing the solvent, baking may be further conducted at 100° C. or higher. The temperature and time for baking are not particularly limited as long as the electrophotographic properties are obtained. In the wet method, the moisture contained in the inorganic particles may be removed before adding the electron-accepting compound. For example, the moisture may be removed by stirring and heating the inorganic particles in a solvent or by boiling together with the solvent.

Attaching the electron-accepting compound may be conducted before, after, or simultaneously with the surface treatment of the inorganic particles by a surface treatment agent.

The amount of the electron-accepting compound contained relative to the inorganic particles may be, for example, 0.01 mass % or more and 20 mass % or less, and is preferably 0.01 mass % or more and 10 mass % or less.

When the undercoat layer contains inorganic particles and resin particles, examples of the binder resin used in the undercoat layer include known materials such as known polymer compounds such as acetal resins (for example, polyvinyl butyral), polyvinyl alcohol resins, polyvinyl acetal resins, casein resins, polyamide resins, cellulose resins, gelatin, polyurethane resins, polyester resins, unsaturated polyester resins, methacrylic resins, acrylic resins, polyvinyl chloride resins, polyvinyl acetate resins, vinyl chloride-vinyl acetate-maleic anhydride resins, silicone resins, silicone-alkyd resins, urea resins, phenolic resins, phenol-formaldehyde resins, melamine resins, urethane resins, alkyd resins, and epoxy resins; zirconium chelate compounds; titanium chelate compounds; aluminum chelate compounds; titanium alkoxide compounds; organic titanium compounds; and silane coupling agents.

Other examples of the binder resin used in the undercoat layer include charge transporting resins that have charge transporting groups, and conductive resins (for example, polyaniline).

Among these, a resin that is insoluble in the coating solvent in the overlying layer is suitable as the binder resin used in the undercoat layer. Examples of the particularly suitable resin include thermosetting resins such as a urea resin, a phenolic resin, a phenol-formaldehyde resin, a melamine resin, a urethane resin, an unsaturated polyester resin, an alkyd resin, and an epoxy resin; and a resin obtained by a reaction between a curing agent and at least one resin selected from the group consisting of a polyamide resin, a polyester resin, a polyether resin, a methacrylic resin, an acrylic resin, a polyvinyl alcohol resin, and a polyvinyl acetal resin.

When two or more of these binder resins are used in combination, the mixing ratios are set as necessary.

The undercoat layer may contain various additives to improve electrical properties, environmental stability, and image quality.

Examples of the additives include known materials such as electron transporting pigments based on polycyclic condensed materials and azo materials, zirconium chelate compounds, titanium chelate compounds, aluminum chelate compounds, titanium alkoxide compounds, organic titanium compounds, and silane coupling agents. The silane coupling agent is used to surface-treat the inorganic particles as mentioned above, but may be further added as an additive to the undercoat layer.

Examples of the silane coupling agent that serves as an additive include vinyltrimethoxysilane, 3-methacryloxypropyl-tris(2-methoxyethoxy)silane, 2-(3,4-epoxycyclohexyl) ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compounds include zirconium butoxide, zirconium ethyl acetoacetate, zirconium triethanolamine, acetylacetonate zirconium butoxide, ethyl acetoacetate zirconium butoxide, zirconium acetate, zirconium oxalate, zirconium lactate, zirconium phosphonate, zirconium octanoate, zirconium naphthenate, zirconium laurate, zirconium stearate, zirconium isostearate, methacrylate zirconium butoxide, stearate zirconium butoxide, and isostearate zirconium butoxide.

Examples of the titanium chelate compounds include tetraisopropyl titanate, tetra-n-butyl titanate, butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compounds include aluminum isopropylate, monobutoxyaluminum diisopropylate, aluminum butyrate, diethylacetoacetate aluminum diisopropylate, and aluminum tris(ethylacetoacetate).

These additives may be used alone, or two or more compounds may be used as a mixture or a polycondensation product.

When the undercoat layer contains inorganic particles and resin particles, the undercoat layer may have a Vickers hardness of 35 or more.

In order to suppress moire images, the surface roughness (ten-point average roughness) of the undercoat layer may be adjusted to be in the range of 1/(4n) (n represents the refractive index of the overlying layer) to ½ of λ representing the laser wavelength used for exposure.

In order to adjust the surface roughness, resin particles and the like may be added to the undercoat layer. Examples of the resin particles include silicone resin particles and crosslinking polymethyl methacrylate resin particles. The surface of the undercoat layer may be polished to adjust the surface roughness. Examples of the polishing method include buff polishing, sand blasting, wet honing, and grinding.

When the undercoat layer contains inorganic particles and resin particles, the undercoat layer may be formed by any known method, and, for example, may be formed by preparing an undercoat layer-forming solution by adding the above-mentioned components to a solvent, forming a coating film of this solution, and drying and, if desired, heating the coating film.

Examples of the solvent used for preparing the undercoat layer-forming solution include known organic solvents, such as alcohol solvents, aromatic hydrocarbon solvents, halogenated hydrocarbon solvents, ketone solvents, ketone alcohol solvents, ether solvents, and ester solvents.

Specific examples of the solvent include common organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method for dispersing inorganic particles in preparing the undercoat layer-forming solution include known methods that use a roll mill, a ball mill, a vibrating ball mill, an attritor, a sand mill, a colloid mill, and a paint shaker.

Examples of the method for applying the undercoat layer-forming solution to the conductive substrate include common methods such as a blade coating method, a wire bar coating method, a spray coating method, a dip coating method, a bead coating method, an air knife coating method, and a curtain coating method.

When the undercoat layer contains inorganic particles and resin particles, the thickness of the undercoat layer is preferably set within the range of 15 μm or more, and more preferably within the range of 20 μm or more and 50 μm or less.

Layer Formed of Metal Oxide Layer

The undercoat layer formed of a metal oxide layer refers to a layer-shape article formed of a metal oxide (for example, a CVD film of a metal oxide, a vapor-deposited film of a metal oxide, or a sputter-deposited film of a metal oxide), and an aggregate or an assembly of metal oxide particles is excluded.

The undercoat layer formed of a metal oxide layer may be a metal oxide layer composed of a metal oxide that contains a group 13 element and oxygen since such a metal oxide has excellent mechanical strength, light-transmittance properties, and electrical conductivity.

Examples of the metal oxide that contains a group 13 element and oxygen include metal oxides such as gallium oxide, aluminum oxide, indium oxide, and boron oxide, and mixed crystals thereof.

Among these, gallium oxide is particularly preferable as the metal oxide containing a group 13 element and oxygen from the viewpoint of good mechanical strength, light-transmittance, n-type conductivity, and the conductivity-controllability.

In other words, the layer formed of a metal oxide is preferably a metal oxide layer that contains gallium and oxygen.

The undercoat layer formed of a metal oxide layer may be any layer that contains a group 13 element (preferably gallium) and oxygen; however, if needed, the undercoat layer may be a layer that contains hydrogen and carbon atoms.

The undercoat layer formed of a metal oxide layer may further contain zinc (Zn).

In order to control the conductivity type, the undercoat layer formed of a metal oxide layer may include other elements. The undercoat layer formed of a metal oxide layer may contain at least one selected from C, Si, Ge, and Sn if the conductivity type is to be controlled to n-type, and may contain at least one selected from N, Be, Mg, Ca, and Sr if the conductivity type is to be controlled to p-type.

In particular, the undercoat layer formed of a metal oxide layer may contain a group 13 element, oxygen, and hydrogen, and the total of the element constitutional ratios of the group 13 element, oxygen, and hydrogen relative to all elements constituting the undercoat layer formed of the metal oxide layer may be 90 at % or more.

The undercoat layer formed of a metal oxide layer is formed by a known vapor-phase film deposition method such as a plasma chemical vapor deposition (CVD) method, an organic metal vapor growth method, molecular beam epitaxy, vapor deposition, or sputtering.

Since the specific method for forming the undercoat layer formed of a metal oxide layer is the same as the method for forming the inorganic protection layer described below, the description therefor is omitted here.

The thickness of the undercoat layer formed of a metal oxide layer is preferably 0.1 μm or more and 10 μm or less, more preferably 0.2 μm or more and 8.0 μm or less, and yet more preferably 0.5 μm or more and 5.0 μm or less.

Intermediate Layer

Although not illustrated in the drawings, an intermediate layer may be further provided between the undercoat layer and the photosensitive layer or between the conductive substrate and the undercoat layer.

The intermediate layer is, for example, a layer that contains a resin. Examples of the resin used in the intermediate layer include polymer compounds such as acetal resins (for example, polyvinyl butyral), polyvinyl alcohol resins, polyvinyl acetal resins, casein resins, polyamide resins, cellulose resins, gelatin, polyurethane resins, polyester resins, methacrylic resins, acrylic resins, polyvinyl chloride resins, polyvinyl acetate resins, vinyl chloride-vinyl acetate-maleic anhydride resins, silicone resins, silicone-alkyd resins, phenol-formaldehyde resins, and melamine resins.

The intermediate layer may contain an organic metal compound. Examples of the organic metal compound used in the intermediate layer include organic metal compounds containing metal atoms such as zirconium, titanium, aluminum, manganese, and silicon.

These compounds used in the intermediate layer may be used alone, or two or more compounds may be used as a mixture or a polycondensation product.

In particular, the intermediate layer may be a layer that contains an organic metal compound that contains zirconium atoms or silicon atoms.

The intermediate layer may be formed by any known method, and, for example, may be formed by preparing an intermediate-layer-forming solution by adding the above-mentioned components to a solvent, forming a coating film of this solution, and drying and, if desired, heating the coating film.

Examples of the application method for forming the intermediate layer include common methods such as a dip coating method, a lift coating method, a wire bar coating method, a spray coating method, a blade coating method, a knife coating method, and a curtain coating method.

The thickness of the intermediate layer may be set within the range of, for example, 0.1 μm or more and 3 μm or less. The intermediate layer may be used as the undercoat layer.

Charge Generation Layer

The charge generation layer is, for example, a layer that contains a charge generation material and a binder resin. The charge generation layer may be a vapor deposited layer of a charge generation material. The vapor deposited layer of the charge generation material may be used when an incoherent light source such as a light emitting diode (LED) or an organic electro-luminescence (EL) image array is used.

Examples of the charge generation material include azo pigments such as bisazo and trisazo pigments; fused-ring aromatic pigments such as dibromoanthanthrone; perylene pigments; pyrrolopyrrole pigments; phthalocyanine pigments; zinc oxide; and trigonal selenium.

Among these, in order to be compatible to the near-infrared laser exposure, a metal phthalocyanine pigment or a metal-free phthalocyanine pigment may be used as the charge generation material. Specific examples thereof include hydroxygallium phthalocyanine, chlorogallium phthalocyanine, dichlorotin phthalocyanine, and titanyl phthalocyanine.

In order to be compatible to the near ultraviolet laser exposure, the charge generation material may be a fused-ring aromatic pigment such as dibromoanthanthrone, a thioindigo pigment, a porphyrazine compound, zinc oxide, trigonal selenium, a bisazo pigment, or the like.

When an incoherent light source, such as an LED or an organic EL image array having an emission center wavelength in the range of 450 nm or more and 780 nm or less, is used, the charge generation material described above may be used; however, from the viewpoint of the resolution, when the photosensitive layer is as thin as 20 μm or less, the electric field intensity in the photosensitive layer is increased, charges injected from the substrate are decreased, and image defects known as black spots tend to occur. This is particularly noticeable when a charge generation material, such as trigonal selenium or a phthalocyanine pigment, that is of a p-conductivity type and easily generates dark current is used.

In contrast, when an n-type semiconductor, such as a fused-ring aromatic pigment, a perylene pigment, or an azo pigment, is used as the charge generation material, dark current rarely occurs and, even when the thickness is small, image defects known as black spots can be suppressed.

Determination of the n-type is performed by a common time-of-flight method and by the polarity of the flowing photocurrent, and a material in which electrons rather than holes are likely to flow as a carrier is determined to be of an n-type.

The binder resin used in the charge generation layer is selected from a wide range of insulating resins. Alternatively, the binder resin may be selected from organic photoconductive polymers, such as poly-N-vinylcarbazole, polyvinyl anthracene, polyvinyl pyrene, and polysilane.

Examples of the binder resin include, polyvinyl butyral resins, polyarylate resins (polycondensates of bisphenols and aromatic dicarboxylic acids etc.), polycarbonate resins, polyester resins, phenoxy resins, vinyl chloride-vinyl acetate copolymers, polyamide resins, acrylic resins, polyacrylamide resins, polyvinyl pyridine resins, cellulose resins, urethane resins, epoxy resins, casein, polyvinyl alcohol resins, and polyvinyl pyrrolidone resins. Here, "insulating" means having a volume resistivity of $10^{13}$ Ω·cm or more.

These binder resins may be used alone or in combination as a mixture.

The blend ratio of the charge generation material to the binder resin may be 10:1 to 1:10 in terms of mass ratio.

The charge generation layer may contain other known additives.

The charge generation layer may be formed by any known method, and, for example, may be formed by preparing a charge generation layer-forming solution by adding the above-mentioned components to a solvent, forming a coating film of this solution, and drying and, if desired, heating the coating film. The charge generation layer may be a vapor deposited layer of a charge generation material. The charge generation layer may be formed by vapor deposition particularly when a fused-ring aromatic pigment or a perylene pigment is used as the charge generation material.

Specific examples of the solvent for preparing the charge generation layer-forming solution include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in combination as a mixture.

In order to disperse particles (for example, the charge generation material) in the charge generation layer-forming solution, a media disperser such as a ball mill, a vibrating ball mill, an attritor, a sand mill, or a horizontal sand mill, or a media-less disperser such as stirrer, an ultrasonic disperser, a roll mill, or a high-pressure homogenizer is used, for example. Examples of the high-pressure homogenizer include a collision-type homogenizer in which a dispersion in a high-pressure state is dispersed through liquid-liquid collision or liquid-wall collision, and a penetration-type homogenizer in which a fluid in a high-pressure state is caused to penetrate through fine channels.

In dispersing, it is effective to set the average particle diameter of the charge generation material in the charge generation layer-forming solution to 0.5 μm or less, preferably 0.3 μm or less, and more preferably 0.15 μm or less.

Examples of the method for applying the charge generation layer-forming solution to the undercoat layer (or the intermediate layer) include common methods such as a blade coating method, a wire bar coating method, a spray coating method, a dip coating method, a bead coating method, an air knife coating method, and a curtain coating method.

The thickness of the charge generation layer is preferably set within the range of 0.1 μm or more and 5.0 μm or less, more preferably within the range of 0.15 μm or more and 2.0 μm or less.

Image Forming Apparatus (and Process Cartridge)

An image forming apparatus of an exemplary embodiment includes an electrophotographic photoreceptor, a charging unit that charges a surface of the electrophotographic photoreceptor, an electrostatic latent image forming unit that forms an electrostatic latent image on the charged surface of the electrophotographic photoreceptor, a developing unit that develops the electrostatic latent image on the surface of the electrophotographic photoreceptor by using a developer that contains a toner so as to form a toner image, and a transfer unit that transfers the toner image onto a surface of a recording medium. The photoreceptor of the present exemplary embodiment described above is used as the electrophotographic photoreceptor.

The image forming apparatus of the exemplary embodiment is applied to a known image forming apparatus, examples of which include an apparatus equipped with a fixing unit that fixes the toner image transferred onto the surface of the recording medium; a direct transfer type apparatus with which the toner image formed on the surface of the electrophotographic photoreceptor is directly transferred to the recording medium; an intermediate transfer type apparatus with which the toner image formed on the surface of the electrophotographic photoreceptor is first transferred to a surface of an intermediate transfer body and then the toner image on the surface of the intermediate transfer body is transferred to the surface of the recording medium; an apparatus equipped with a cleaning unit that cleans the surface of the electrophotographic photoreceptor after the toner image transfer and before charging; an apparatus equipped with a charge erasing unit that erases the charges on the surface of the electrophotographic photoreceptor by applying the charge erasing light after the toner image transfer and before charging; and an apparatus equipped with an electrophotographic photoreceptor heating member that elevates the temperature of the electrophotographic photoreceptor to reduce the relative temperature.

In the intermediate transfer type apparatus, the transfer unit includes, for example, an intermediate transfer body having a surface onto which a toner image is to be transferred, a first transfer unit that conducts first transfer of the toner image on the surface of the electrophotographic photoreceptor onto the surface of the intermediate transfer body, and a second transfer unit that conducts second transfer of the toner image on the surface of the intermediate transfer body onto a surface of a recording medium.

The image forming apparatus of this exemplary embodiment may be of a dry development type or a wet development type (development type that uses a liquid developer).

In the image forming apparatus of the exemplary embodiment, for example, a section that includes the electrophotographic photoreceptor may be configured as a cartridge structure (process cartridge) detachably attachable to the image forming apparatus. A process cartridge equipped with the photoreceptor of the present exemplary embodiment may be used as this process cartridge.

The process cartridge may include, in addition to the electrophotographic photoreceptor, at least one selected from the group consisting of a charging unit, an electrostatic latent image forming unit, a developing unit, and a transfer unit.

Although some examples of the image forming apparatus of an exemplary embodiment are described below, these examples are not limiting. Only relevant sections illustrated in the drawings are described, and descriptions of other sections are omitted.

Figure 4:
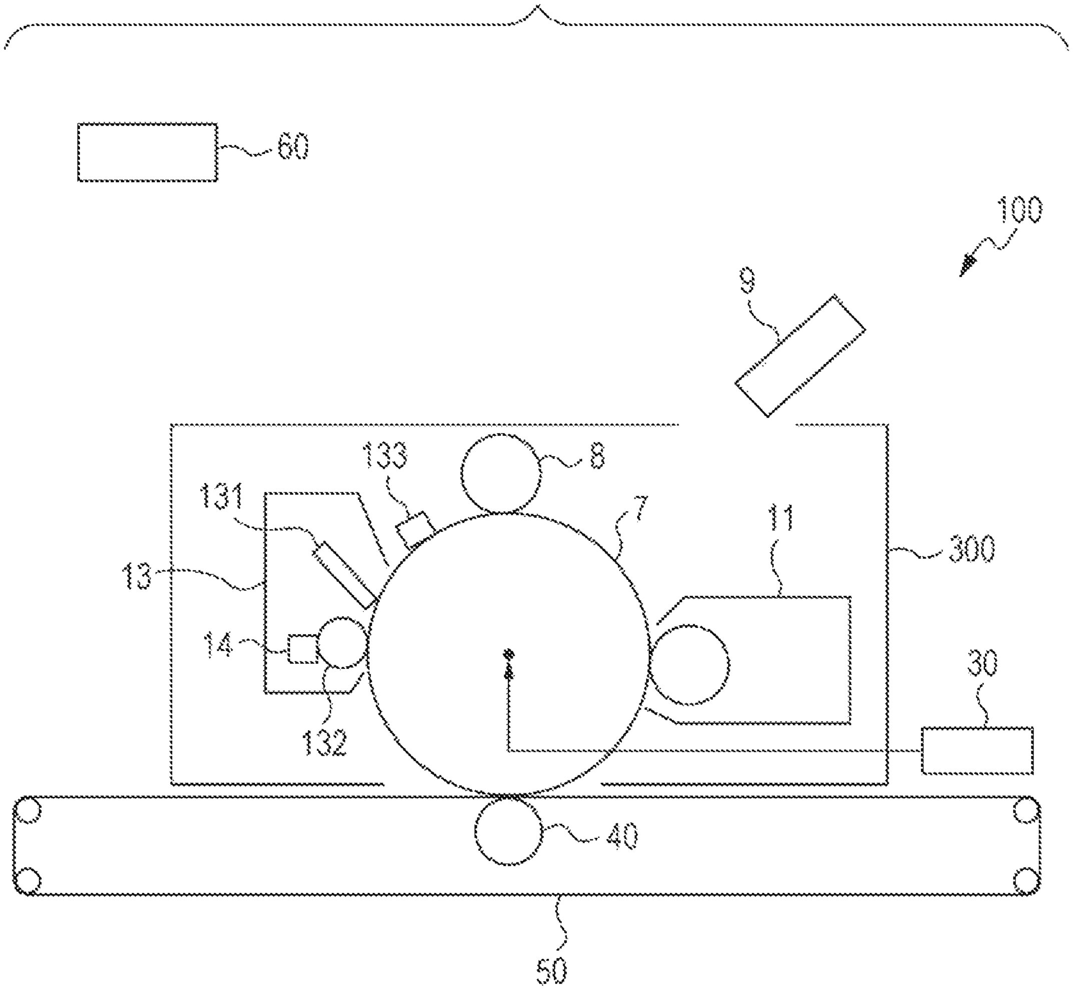
FIG. 4 is a schematic diagram of one example of an image forming apparatus according to an exemplary embodiment.

FIG. 4 is a schematic cross-sectional view of one example of an image forming apparatus according to one exemplary embodiment.

As illustrated in FIG. 4, an image forming apparatus 100 of this exemplary embodiment includes a process cartridge 300 equipped with an electrophotographic photoreceptor 7, an exposing device 9 (one example of the electrostatic latent image forming unit), a transfer device 40 (first transfer device), and an intermediate transfer body 50. In this image forming apparatus 100, the exposing device 9 is positioned so that light can be applied to the electrophotographic photoreceptor 7 from the opening of the process cartridge 300, the transfer device 40 is positioned to oppose the electrophotographic photoreceptor 7 with the intermediate transfer body 50 therebetween, and the intermediate transfer body 50 has a portion in contact with the electrophotographic photoreceptor 7. Although not illustrated in the drawings, a second transfer device that transfers the toner image on the intermediate transfer body 50 onto a recording medium (for example, a paper sheet) is also provided. The intermediate transfer body 50, the transfer device 40 (first transfer device), and the second transfer device (not illustrated) correspond to examples of the transfer unit. In the image forming apparatus 100, a control device 60 (one example of a controller unit) controls operation of various devices and members in the image forming apparatus 100, and are connected to these devices and members.

The process cartridge 300 illustrated in FIG. 4 integrates and supports the electrophotographic photoreceptor 7, a charging device 8 (one example of the charging unit), a developing device 11 (one example of the developing unit), and a cleaning device 13 (one example of the cleaning unit) in the housing. The cleaning device 13 has a cleaning blade (one example of the cleaning member) 131, and the cleaning blade 131 is in contact with the surface of the electrophotographic photoreceptor 7. The cleaning member may take a form other than the cleaning blade 131, and may be a conductive or insulating fibrous member that can be used alone or in combination with the cleaning blade 131.

Although an example of the image forming apparatus equipped with a fibrous member 132 (roll) that supplies a lubricant 14 to the surface of the electrophotographic photoreceptor 7 and a fibrous member 133 (flat brush) that assists cleaning is illustrated in FIG. 4, these members are optional.

The structures of the image forming apparatus of this exemplary embodiment will now be described.

Charging Device

Examples of the charging device 8 include contact-type chargers that use conductive or semi-conducting charging rollers, charging brushes, charging films, charging rubber blades, and charging tubes. Known chargers such as non-contact-type roller chargers, and scorotron chargers and corotron chargers that utilize corona discharge are also used.

Exposing Device

Examples of the exposing device 9 include optical devices that can apply light, such as semiconductor laser light, LED, or liquid crystal shutter light, into a particular image shape onto the surface of the electrophotographic photoreceptor 7. The wavelength of the light source is to be within the spectral sensitivity range of the electrophotographic photoreceptor. The mainstream wavelength of the semiconductor lasers is near infrared having an oscillation wavelength at about 780 nm. However, the wavelength is not limited to this, and a laser having an oscillation wavelength on the order of 600 nm or a blue laser having an oscillation wavelength of 400 nm or more and 450 nm or less may be used. In order to form a color image, a surface-emitting laser light source that can output multi beams is also effective.

Developing Device

Examples of the developing device 11 include common developing devices that perform development by using a developer in contact or non-contact manner. The developing device 11 is not particularly limited as long as the aforementioned functions are exhibited, and is selected according to the purpose. An example thereof is a known developer that has a function of attaching a one-component developer or a two-component developer to the electrophotographic photoreceptor 7 by using a brush, a roller, or the like. In particular, a development roller that retains the developer on its surface may be used.

The developer used in the developing device 11 may be a one-component developer that contains only a toner or a two-component developer that contains a toner and a carrier. The developer may be magnetic or non-magnetic. Any known developers may be used as these developers.

Cleaning Device

A cleaning blade type device equipped with a cleaning blade 131 is used as the cleaning device 13.

A fur brush cleaning method or a simultaneous development/cleaning method may be employed instead of the cleaning blade method.

Transfer Device

Examples of the transfer device 40 include contact-type transfer chargers that use belts, rollers, films, rubber blades, etc., and known transfer chargers such as scorotron transfer chargers and corotron transfer chargers that utilize corona discharge.

Intermediate Transfer Body

A belt-shaped member (intermediate transfer belt) that contains semi-conducting polyimide, polyamide imide, polycarbonate, polyarylate, a polyester, a rubber, or the like is used as the intermediate transfer body 50. The form of the intermediate transfer body other than the belt may be a drum.

Control Device

The control device 60 is configured as a computer that performs control and various computing for the entire apparatus. Specifically, the control device 60 is equipped with a central processing unit (CPU), a read only memory (ROM) storing various programs, a random access memory (RAM) used as the work area during execution of the program, a non-volatile memory storing various information, and an input/output interface (I/O). The CPU, the ROM, the RAM, the non-volatile memory, and the I/O are connected through a bus. Various devices of the image forming apparatus 100, such as the electrophotographic photoreceptor 7 (including a drive motor 30), the charging device 8, the exposing device 9, the developing device 11, and the transfer device 40, are connected to the I/O.

The CPU, for example, runs the program stored in the ROM or the non-volatile memory (for example, a control program such as an image forming sequence or recovering sequence), and controls the operation of the respective devices of the image forming apparatus 100. The RAM is used as a work memory. Programs executed by the CPU and data necessary for processing in the CPU are stored in the ROM and the non-volatile memory. The control programs and various data may be stored in other storing devices, such as a storage unit, or may be acquired from exterior through a communication unit.

Various types of drives may be connected to the control device 60. Examples of the drives include devices that can read data from a computer-readable portable recording medium, such as a flexible disk, a magnetooptical disk, a CD-ROM, a DVD-ROM, or a universal serial bus (USB) memory, and devices that can write data on the recording media. When a drive is provided, a control program may be stored in a portable recording medium and the program may be executed by reading the portable recording medium with a corresponding drive.

Figure 5:
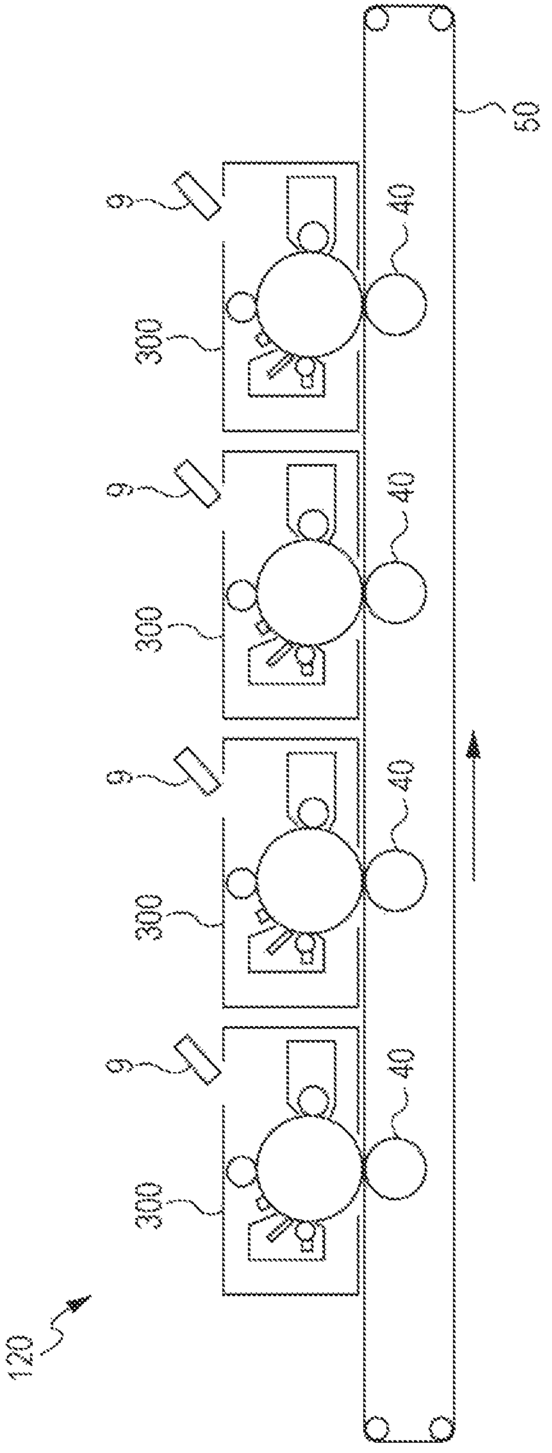
FIG. 5 is a schematic diagram of another example of the image forming apparatus according to the exemplary embodiment.

FIG. 5 is a schematic cross-sectional view of one example of an image forming apparatus according to one exemplary embodiment.

An image forming apparatus 120 illustrated in FIG. 5 is a tandem-system multicolor image forming apparatus equipped with four process cartridges 300. In the image forming apparatus 120, four process cartridges 300 are arranged in parallel on the intermediate transfer body 50, and one electrophotographic photoreceptor is used for one color. The image forming apparatus 120 is identical to the image forming apparatus 100 except for the tandem system.

The image forming apparatus 100 of this exemplary embodiment is not limited to the structure described above. For example, a first charge erasing device that orients the polarity of the residual toner to facilitate removal with the cleaning brush may be disposed around the electrophotographic photoreceptor 7 and on the downstream of the transfer device 40 in the electrophotographic photoreceptor 7 rotation direction and on the upstream of the cleaning device 13 in the electrophotographic photoreceptor rotation direction. Alternatively, a second charge erasing device that erases charges on the surface of the electrophotographic photoreceptor 7 may be disposed on the downstream of the cleaning device 13 in the electrophotographic photoreceptor rotation direction and on the upstream of the charging device 8 in the electrophotographic photoreceptor rotation direction.

The image forming apparatus 100 of this exemplary embodiment is not limited to the structure described above, and a known structure, for example, a direct transfer-type image forming apparatus, in which a toner image formed on the electrophotographic photoreceptor 7 is directly transferred to a recording medium, may be employed.

EXAMPLES

The present disclosure will now be specifically described through Examples which do not limit the present disclosure. The materials, the amount thereof used, the ratios, the process sequence, and other features described in Examples below are subject to modifications as appropriate as long as they are within the scope of the present disclosure. Here, “parts” means parts by mass unless otherwise noted.

Example 1

Preparation of Undercoat Layer

An undercoat layer composed of hydrogen-containing gallium oxide is formed on a surface of a honed aluminum substrate (outer diameter: 30 mm, length: 365 mm, thickness: 1.0 mm). The undercoat layer is formed by using the film forming apparatus having the structure illustrated in FIGS. 2A and 2B.

The aluminum substrate is placed on the substrate supporting member 213 in the deposition chamber 210 of the film forming apparatus, and the interior of the deposition chamber 210 is vacuum-evacuated through the exhaust port 211 until the pressure reaches 0.1 Pa.

Next, He-diluted 40% oxygen gas (flow rate: 1.4 sccm) and hydrogen gas (flow rate: 50 sccm) are introduced from the gas inlet duct 220 into the high-frequency discharge tube unit 221 in which the flat plate electrode 219 having a diameter of 85 mm is provided; and, by using the high-frequency power supply unit 218 and a matching circuit (not illustrated in FIGS. 2A and 2B), a 13.56 MHz radiowave is set to an output of 150 W and discharging is performed from the flat plate electrode 219 by matching with a tuner. The reflected wave during this process is 0 W.

Next, trimethylgallium gas (flow rate: 1.9 sccm) is introduced from the gas inlet duct 215 through the shower nozzle 216 into the plasma diffusing area 217 inside the deposition chamber 210. During this process, the reaction pressure inside the deposition chamber 210 measured by a Baratron vacuum gauge is 5.3 Pa.

Under this condition, the aluminum substrate is rotated at a speed of 500 rpm while conducting film formation for 300 minutes so as to form an undercoat layer having a thickness of 1.0 μm on the surface of the aluminum substrate.

The element compositional ratio of oxygen to gallium (oxygen/gallium) in the undercoat layer is 1.11.

Preparation of Charge Generation Layer

A mixture containing 15 parts by mass of hydroxygallium phthalocyanine serving as a charge generation material and having diffraction peaks at least at Bragg’s angles (2θ+0.2°) of 7.3°, 16.0°, 24.9°, and 28.0° in an X-ray diffraction spectrum obtained by using CuKα X-ray, 10 parts by mass of a vinyl chloride-vinyl acetate copolymer (VMCH produced by Nippon Unicar Company Limited) serving as a binder resin, and 200 parts by mass of n-butyl acetate is dispersed in a sand mill with glass beads having a diameter ϕ of 1 mm for 4 hours. To the resulting dispersion, 175 parts by mass of n-butyl acetate and 180 parts by mass of methyl ethyl ketone are added and stirred so as to obtain a coating solution for forming a charge generation layer. This coating solution for forming a charge generation layer is applied to the undercoat layer by dip coating, and dried at room temperature (25° C.) to form a charge generation layer having a thickness of 0.2 μm.

Preparation of Charge Transport Layer

The inorganic particles of a type and in an amount illustrated in Table are mixed with 250 parts by mass of tetrahydrofuran. To the resulting mixture, a charge transport material of a type and in an amount described in Table and a bisphenol Z polycarbonate resin (viscosity-average molecular weight: 50000) serving as a binder resin are added while maintaining the liquid temperature at 20° C. The resulting mixture is stirred and mixed for 12 hours to obtain a charge transport layer-forming solution. This charge transport layer-forming solution is applied to the charge generation layer, and dried at 135° C. for 40 minutes to form a charge transport layer having a thickness of 30 μm.

Formation of Inorganic Protection Layer

Next, an inorganic protection layer composed of hydrogen-containing gallium oxide is formed on a surface of the charge transport layer. The inorganic protection layer is formed by using the film forming apparatus having the structure illustrated in FIGS. 2A and 2B.

First, the substrate with the aforementioned layers formed thereon is placed on the substrate supporting member 213 in the deposition chamber 210 of the film forming apparatus, and the interior of the deposition chamber 210 is vacuum-evacuated through the exhaust port 211 until the pressure reaches 0.1 Pa.

Next, He-diluted 40% oxygen gas (flow rate: 1.8 sccm) and hydrogen gas (flow rate: 50 sccm) are introduced from the gas inlet duct 220 into the high-frequency discharge tube unit 221 in which the flat plate electrode 219 having a diameter of 85 mm is provided; and, by using the high-frequency power supply unit 218 and a matching circuit (not illustrated in FIG. 4), a 13.56 MHz radiowave is set to an output of 150 W and discharging is performed from the flat plate electrode 219 by matching with a tuner. The reflected wave during this process is 0 W.

Next, trimethylgallium gas (flow rate: 1.9 sccm) is introduced from the gas inlet duct 215 through the shower nozzle 216 into the plasma diffusing area 217 inside the deposition chamber 210. During this process, the reaction pressure inside the deposition chamber 210 measured by a Baratron vacuum gauge is 5.3 Pa.

Under this condition, the substrate is rotated at a speed of 500 rpm while conducting film formation for 900 minutes. As a result, an inorganic protection layer having a thickness of 3.0 μm is formed on the surface of the charge transport layer. The outer peripheral surface of the inorganic protection layer has a surface roughness Ra of 1.9 nm. The element compositional ratio of oxygen to gallium (oxygen/gallium) in the inorganic protection layer is 1.35.

Through the above-described steps, a photoreceptor of Example 1 in which an undercoat layer, a charge generation layer, a charge transport layer, and an inorganic protection layer are sequentially formed on a conductive substrate is obtained.

The type and molecular weight of the charge transport material, the amount of the charge transport material contained relative to the total amount of the charge transport materials and the binder resin in the charge transport layer, the type of the inorganic particles, the amount of the inorganic particles relative to the total solid content of the charge transport layer, $C_{1Hz}$, $C_{10Hz}$, and the ratio ($C_{1Hz}$/$C_{10Hz}$) are indicated in Table. In Table, figures in parenthesis under the column indicating the type of the charge transport material indicate the molecular weights of the charge transport materials used.

Examples A2 to A8, Examples B1 to B4, and Comparative Examples 1 to 4

Electrophotographic photoreceptors of respective examples are obtained as in Example 1 except that the type of the charge transport material, the ratio, the amount of the charge transport material relative to the total amount of the charge transport materials and the binder resin in the charge transport layer, the type of inorganic particles, the amount of the inorganic particles contained relative to the total solid content of the charge transport layer, $C_{1Hz}$, $C_{10Hz}$, and the ratio ($C_{1Hz}$/$C_{10Hz}$) are changed as indicated in Table.

Details of the materials used in the examples are as follows.

Inorganic particles: silica particles 1, produced by NIPPON AEROSIL CO., LTD.

Compound A

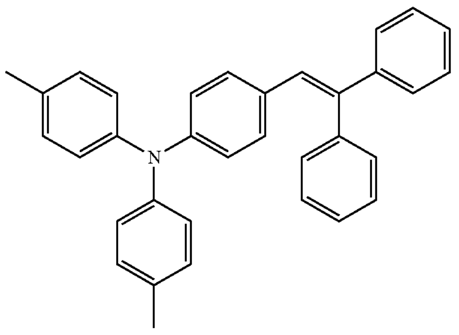

Compound B

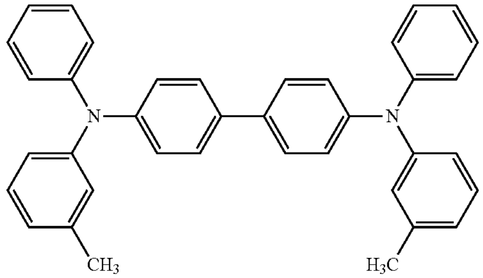

Compound C

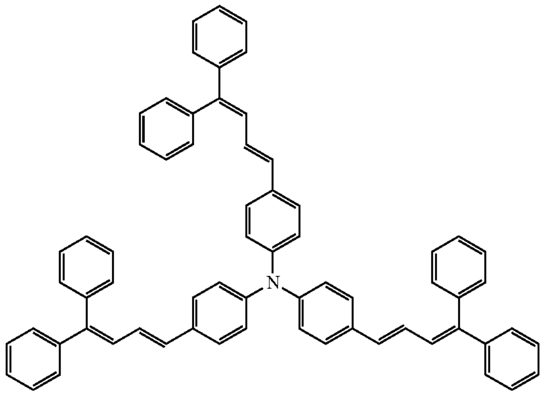

Preparation of Image Forming Apparatus for Evaluation

Each of the electrophotographic photoreceptors of the examples is moved at a speed of 100 mm/min in the photoreceptor axial direction while a load of 100 gf is applied to HEIDON-14 to form cracks in the inorganic protection layer. The obtained electrophotographic photoreceptor is attached to Versant 180 Press produced by Fuji Xerox Co., Ltd. By using a surface potentiometer (Trek 334 produced by Trek Japan Co., Ltd.), a surface potential probe is installed at a position 1 mm remote from the surface of the photoreceptor and in the region to be measured. This image forming apparatus is used for evaluation.

Evaluation of Image Density Fluctuation in the Event of Cracking Due to Continuous Image Formation A halftone image is output on 1000 sheets of A3 paper in the area coverage range of 10% to 90% in 10% increments by using the image forming apparatus for evaluation equipped with the electrophotographic photoreceptor of the example. The image density gradation is evaluated by the following standard using the image on the 10th sheet (initial) and the image on the 1000th sheet (over time) The image density is measured with X-Rite 404 produced by X-Rite Inc. The evaluation results are indicated in Table. G1 to G3 are acceptable.

Evaluation Standard

G1: The difference between the target image density and the actual image density is less than 3%.

G2: The difference between the target image density and the actual image density is 3% or more but less than 5%.

G3: The difference between the target image density and the actual image density is 5% or more but less than 10%.

G4: The difference between the target image density and the actual image density is 10% or more.

TABLE

| | Inorganic fine particles | | Charge transport material | | | | | | Image density fluctuation |
|---|---|---|---|---|---|---|---|---|---|
| | Type | Content [mass %] | Type (molecular weight) | Ratio | Content [mass %] | $C_{1Hz}$ [pF] | $C_{10Hz}$ [pF] | Ratio ($C_{1Hz}/C_{10Hz}$) | |
| Example A1 | Silica particles 1 | 65 | A(452) | — | 20 | 33.8 | 33.5 | 1.01 | G1 |
| Example A2 | Silica particles 1 | 65 | A(452) | — | 40 | 35.6 | 33.9 | 1.05 | G1 |
| Example A3 | Silica particles 1 | 65 | A(452) | — | 10 | 33.8 | 33.5 | 1.01 | G1 |
| Example A4 | Silica particles 1 | 65 | B(512) | — | 20 | 34.0 | 33.7 | 1.01 | G1 |
| Example A5 | Silica particles 1 | 65 | B(512) | — | 40 | 36.8 | 34.1 | 1.08 | G1 |
| Example A6 | Silica particles 1 | 65 | C(858) | — | 20 | 42.2 | 38.4 | 1.10 | G2 |
| Example A7 | Silica particles 1 | 50 | A(452) | — | 30 | 33.8 | 32.2 | 1.05 | G1 |
| Example A8 | Silica particles 1 | 40 | A(452) | — | 30 | 31.3 | 31.0 | 1.01 | G1 |
| Example B1 | Silica particles 1 | 65 | A(452) + B(512) | 1/1 | 20 | 33.9 | 33.6 | 1.01 | G1 |
| Example B2 | Silica particles 1 | 65 | A(452) + B(512) | 1/1 | 40 | 35.8 | 34.1 | 1.05 | G1 |
| Example B3 | Silica particles 1 | 65 | A(452) + B(512) | 1/1 | 10 | 33.8 | 33.5 | 1.01 | G1 |
| Example B4 | Silica particles 1 | 65 | B(512) + C(858) | 1/1 | 40 | 44.6 | 37.2 | 1.20 | G3 |
| Comparative Example 1 | Silica particles 1 | 65 | A(452) | — | 60 | 44.4 | 35.6 | 1.25 | G4 |
| Comparative Example 2 | Silica particles 1 | 65 | B(512) | — | 60 | 48.0 | 38.4 | 1.25 | G4 |
| Comparative Example 3 | Silica particles 1 | 65 | C(858) | — | 60 | 83.6 | 55.8 | 1.50 | G4 |
| Comparative Example 4 | Silica particles 1 | 65 | A(452) + B(512) | 1/1 | 60 | 48.0 | 38.4 | 1.25 | G4 |

As indicated in Table, the electrophotographic photoreceptors of Examples face less image density fluctuation in the event of cracking due to continuous image formation compared to the electrophotographic photoreceptors of Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An electrophotographic photoreceptor comprising:

a conductive substrate;

an undercoat layer on the conductive substrate;

a charge generation layer on the undercoat layer;

a charge transport layer on the charge generation layer; and an inorganic protection layer on the charge transport layer, wherein the charge transport layer contains a binder resin and a charge transport material, and, when impedance of the charge transport layer is measured, a ratio ($C_{1Hz}/C_{10Hz}$) of an electrostatic capacitance $C_{1Hz}$ at 1 Hz to an electrostatic capacitance $C_{10Hz}$ at 10 Hz is 1.1 or less.

2. The electrophotographic photoreceptor according to claim 1, wherein, when impedance of the charge transport layer is measured, the ratio ($C_{1Hz}/C_{10Hz}$) of the electrostatic capacitance $C_{1Hz}$ at 1 Hz to the electrostatic capacitance $C_{1Hz}$ at 10 Hz is 1.0 or more and 1.1 or less.

3. The electrophotographic photoreceptor according to claim 2, wherein the ratio ($C_{1Hz}/C_{10Hz}$) is 1.0 or more and 1.08 or less.

4. The electrophotographic photoreceptor according to claim 3, wherein the charge transport material contains at least one selected from triarylamine derivatives represented by structural formula (a-1) below and benzidine derivatives represented by structural formula (a-2) below:

(a-1)

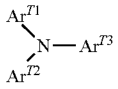

(wherein, in structural formula (a-1), $Ar^{T1}$, $Ar^{T2}$, and $Ar^{T3}$ each independently represent a substituted or unsubstituted aryl group, $-C_6H_4-C(R^{T4})=C(R^{T5})(R^{T6})$, or $-C_6H_4-CH=CH-CH=C(R^{T7})(R^{T8})$; $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group;

(a-2)

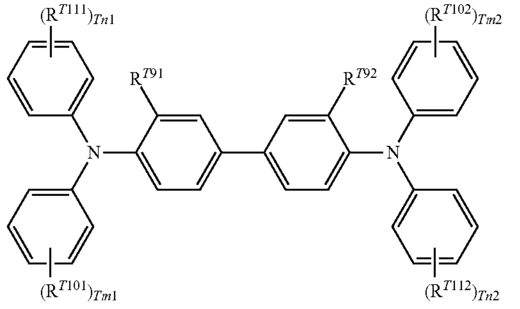

(wherein, in structural formula (a-2), $R^{T91}$ and $R^{T92}$ each independently represent a hydrogen atom, a halogen atom, an alkyl group having 1 to 5 carbon atoms, or an alkoxy group having 1 to 5 carbon atoms; $R^{T101}$, $R^{T102}$, $R^{T111}$, and $R^{T112}$ each independently represent a halogen atom, an alkyl group having 1 to 5 carbon atoms, an alkoxy group having 1 to 5 carbon atoms, an amino group substituted with an alkyl group having 1 or 2 carbon atoms, a substituted or unsubstituted aryl group, $-C(R^{T12})=C(R^{T13})(R^{T14})$, or $-CH=CH-CH=C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group; Tm1, Tm2, Tn1, and Tn2 each independently represent an integer of 0 or more and 2 or less.

5. The electrophotographic photoreceptor according to claim 2, wherein the charge transport material contains at least one selected from triarylamine derivatives represented by structural formula (a-1) below and benzidine derivatives represented by structural formula (a-2) below:

(a-1)

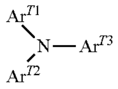

(wherein, in structural formula (a-1), $Ar^{T1}$, $Ar^{T2}$, and $Ar^{T3}$ each independently represent a substituted or unsubstituted aryl group, $-C_6H_4-C(R^{T4})=C(R^{T5})(R^{T6})$, or $-C_6H_4-CH=CH-CH=C(R^{T7})(R^{T8})$; $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group;

(a-2)

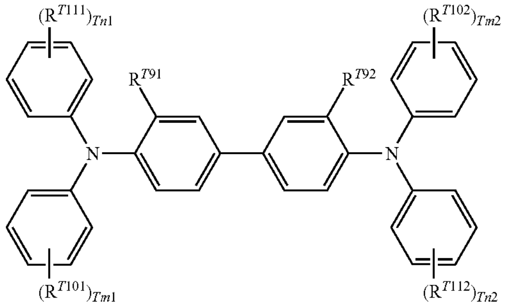

(wherein, in structural formula (a-2), $R^{T91}$ and $R^{T92}$ each independently represent a hydrogen atom, a halogen atom, an alkyl group having 1 to 5 carbon atoms, or an alkoxy group having 1 to 5 carbon atoms; $R^{T101}$, $R^{T102}$, $R^{T111}$, and $R^{T112}$ each independently represent a halogen atom, an alkyl group having 1 to 5 carbon atoms, an alkoxy group having 1 to 5 carbon atoms, an amino group substituted with an alkyl group having 1 or 2 carbon atoms, a substituted or unsubstituted aryl group, $-C(R^{T12})=C(R^{T13})(R^{T14})$, or $-CH=CH-CH=C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group; Tm1, Tm2, Tn1, and Tn2 each independently represent an integer of 0 or more and 2 or less.

6. The electrophotographic photoreceptor according to claim 5, wherein the charge transport material contains a charge transport material having a molecular weight of 850 or less.

7. The electrophotographic photoreceptor according to claim 1, wherein the charge transport material contains at least one selected from triarylamine derivatives represented by structural formula (a-1) below and benzidine derivatives represented by structural formula (a-2) below:

(a-1)

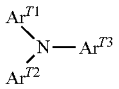

(wherein, in structural formula (a-1), $Ar^{T1}$, $Ar^{T2}$, and $Ar^{T3}$ each independently represent a substituted or unsubstituted aryl group, $-C_6H_4-C(R^{T4})=C(R^{T5})(R^{T6})$, or $-C_6H_4-CH=CH-CH=C(R^{T7})(R^{T8})$; $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group;

(a-2)

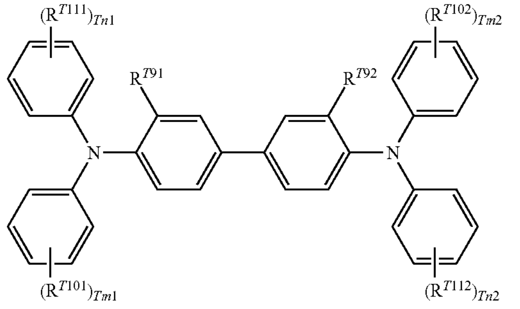

(wherein, in structural formula (a-2), $R^{T91}$ and $R^{T92}$ each independently represent a hydrogen atom, a halogen atom, an alkyl group having 1 to 5 carbon atoms, or an alkoxy group having 1 to 5 carbon atoms; $R^{T101}$, $R^{T102}$, $R^{T111}$, and $R^{T112}$ each independently represent a halogen atom, an alkyl group having 1 to 5 carbon atoms, an alkoxy group having 1 to 5 carbon atoms, an amino group substituted with an alkyl group having 1 or 2 carbon atoms, a substituted or unsubstituted aryl group, $—C(R^{T12})=C(R^{T13})(R^{T14})$, or $—CH=CH—CH=C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group; Tm1, Tm2, Tn1, and Tn2 each independently represent an integer of 0 or more and 2 or less.

8. The electrophotographic photoreceptor according to claim 7, wherein the charge transport material contains a charge transport material having a molecular weight of 850 or less.

9. The electrophotographic photoreceptor according to claim 7, wherein the charge transport material contains a triarylamine derivative represented by structural formula (a-1) described above, and the ratio ($C_{1Hz}/C_{10Hz}$) is 1.0 or more and 1.08 or less, or the amount of the charge transport material contained relative to the total amount of the charge transport materials and the binder resin is 20 mass % or more and 45 mass % or less.

10. The electrophotographic photoreceptor according to claim 1, wherein the charge transport layer further contains inorganic particles, and the inorganic particles contain silica particles.

11. The electrophotographic photoreceptor according to claim 10, wherein an amount of the inorganic particles contained relative to a total solid content of the charge transport layer is 50 mass % or more and 70 mass % or less.

12. A process cartridge detachably attachable to an image forming apparatus, the process cartridge comprising the electrophotographic photoreceptor according to claim 1.

13. An image forming apparatus comprising:

the electrophotographic photoreceptor according to claim 1;

a charging unit that charges a surface of the electrophotographic photoreceptor;

an electrostatic latent image forming unit that forms an electrostatic latent image on the charged surface of the electrophotographic photoreceptor;

a developing unit that develops the electrostatic latent image on the surface of the electrophotographic photoreceptor by using a developer containing a toner so as to form a toner image; and a transfer unit that transfers the toner image onto a surface of a recording medium.

14. An electrophotographic photoreceptor comprising:

a conductive substrate;

an undercoat layer on the conductive substrate;

a charge generation layer on the undercoat layer;

a charge transport layer on the charge generation layer; and an inorganic protection layer on the charge transport layer, wherein the charge transport layer contains a binder resin and two or more charge transport materials, and an amount of the charge transport materials contained relative to a total amount of the charge transport materials and the binder resin in the charge transport layer is 10 mass % or more and 50 mass % or less, wherein the two or more charge transport materials contain at least one selected from triarylamine derivatives represented by structural formula (a-1) below and benzidine derivatives represented by structural formula (a-2) below:

(a-1)

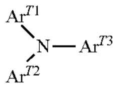

wherein, in structural formula (a-1), $Ar^{T1}$, $Ar^{T2}$, and $Ar^{T3}$ each independently represent a substituted or unsubstituted aryl group, $—C_6H_4—C(R^{T4})=C(R^{T5})(R^{T6})$, or $—C_6H_4—CH=CH—CH=C(R^{T7})(R^{T8})$; $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group;

(a-2)

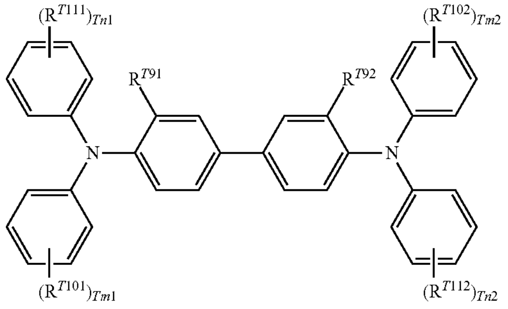

wherein, in structural formula (a-2), $R^{T91}$ and $R^{T92}$ each independently represent a hydrogen atom, a halogen atom, an alkyl group having 1 to 5 carbon atoms, or an alkoxy group having 1 to 5 carbon atoms; $R^{T101}$, $R^{T102}$, $R^{T111}$, and $R^{T112}$ each independently represent a halogen atom, an alkyl group having 1 to 5 carbon atoms, an alkoxy group having 1 to 5 carbon atoms, an amino group substituted with an alkyl group having 1 or 2 carbon atoms, a substituted or unsubstituted aryl group, $—C(R^{T12})=C(R^{T13})(R^{T14})$, or $—CH=CH—CH=C(R^{T15})(R^{T16})$, and $R^{T12}$, $R^{T13}$, $R^{T14}$, $R^{T15}$ and $R^{T16}$ each independently represent a hydrogen atom, a substituted or unsubstituted alkyl group, or a substituted or unsubstituted aryl group; Tm1, Tm2, Tn1, and Tn2 each independently represent an integer of 0 or more and 2 or less.

15. The electrophotographic photoreceptor according to claim 14, wherein, when impedance of the charge transport layer is measured, a ratio ($C_{1Hz}/C_{10Hz}$) of an electrostatic capacitance $C_{1Hz}$ at 1 Hz to an electrostatic capacitance $C_{10Hz}$ at 10 Hz is 1.0 or more and 1.1 or less.

16. The electrophotographic photoreceptor according to claim 15, wherein the ratio ($C_{1Hz}/C_{10Hz}$) is 1.0 or more and 1.08 or less.

17. The electrophotographic photoreceptor according to claim 15, wherein the two or more charge transport materials contains at least one selected from the triarylamine derivatives represented by the structural formula (a-1) and at least one selected from the benzidine derivatives represented by the structural formula (a-2).

18. The electrophotographic photoreceptor according to claim 14, wherein the two or more charge transport material contains at least one selected from the triarylamine derivatives represented by the structural formula (a-1) and at least one selected from the benzidine derivatives represented by the structural formula (a-2).

19. The electrophotographic photoreceptor according to claim 18, wherein the charge transport material contains a charge transport material having a molecular weight of 850 or less.

20. The electrophotographic photoreceptor according to claim 14, wherein the charge transport material contains at least one selected from the triarylamine derivatives represented by structural formula (a-1).

* * * * *